United States Patent
Matsuzaki

(10) Patent No.: US 10,696,860 B2
(45) Date of Patent: Jun. 30, 2020

(54) REACTION LIQUID AND RECORDING METHOD

(71) Applicant: Seiko Epson Corporation, Tokyo (JP)

(72) Inventor: Akiko Matsuzaki, Matsumoto (JP)

(73) Assignee: Sieko Epson Corporation (JP)

( * ) Notice: Subject to any disclaimer, the term of this patent is extended or adjusted under 35 U.S.C. 154(b) by 0 days.

(21) Appl. No.: 16/142,038

(22) Filed: Sep. 26, 2018

(65) Prior Publication Data
US 2019/0092959 A1    Mar. 28, 2019

(30) Foreign Application Priority Data
Sep. 28, 2017    (JP) ................................ 2017-188622

(51) Int. Cl.
| | |
|---|---|
| *C09D 11/54* | (2014.01) |
| *C09D 11/033* | (2014.01) |
| *C09D 11/36* | (2014.01) |
| *C09D 11/38* | (2014.01) |
| *B41J 11/00* | (2006.01) |
| *B41M 5/00* | (2006.01) |
| *B41M 7/00* | (2006.01) |

(52) U.S. Cl.
CPC .......... *C09D 11/54* (2013.01); *B41J 11/0015* (2013.01); *B41M 7/0018* (2013.01); *C09D 11/033* (2013.01); *C09D 11/36* (2013.01); *C09D 11/38* (2013.01); *B41M 5/0017* (2013.01)

(58) Field of Classification Search
None
See application file for complete search history.

(56) References Cited

U.S. PATENT DOCUMENTS

| | | | |
|---|---|---|---|
| 6,261,349 B1 | 7/2001 | Nagai et al. | |
| 10,047,238 B2 * | 8/2018 | Matsuzaki | C09D 11/54 |
| 2010/0080913 A1 * | 4/2010 | Irita | C09D 11/101 427/258 |
| 2011/0292117 A1 * | 12/2011 | Goto | C09D 11/322 347/21 |
| 2012/0128949 A1 * | 5/2012 | Goto | B41M 5/0017 428/207 |
| 2012/0268521 A1 * | 10/2012 | Moribe | C09D 11/322 347/21 |

(Continued)

FOREIGN PATENT DOCUMENTS

| | | |
|---|---|---|
| JP | H10-250216 A | 9/1998 |
| JP | 2004-276253 A | 10/2004 |

(Continued)

OTHER PUBLICATIONS

Surfynol DF-110D Safety Data Sheet, from Evonik Resource Efficiency GmBH, Jun. 2019; 11 pages.*

(Continued)

*Primary Examiner* — Helene Klemanski
(74) *Attorney, Agent, or Firm* — Harness, Dickey & Pierce, P.L.C.

(57) ABSTRACT

There is provided a reaction liquid to be attached to a recording medium to which an ink composition is to be attached, the reaction liquid including an aggregating agent which aggregates components of the ink composition, water, and a surfactant, in which a content of the surfactant is 2% by mass or more and 10% by mass or less with respect to a total mass of the reaction liquid.

26 Claims, 1 Drawing Sheet

(56) References Cited

U.S. PATENT DOCUMENTS

| | | | | |
|---|---|---|---|---|
| 2013/0088543 | A1* | 4/2013 | Tsuji | B41J 2/01 347/21 |
| 2013/0147889 | A1* | 6/2013 | Kanasugi | B41J 2/0057 347/103 |
| 2015/0273883 | A1* | 10/2015 | Okuda | B41J 2/2114 347/21 |
| 2015/0274992 | A1 | 10/2015 | Aoyama et al. | |
| 2016/0083603 | A1* | 3/2016 | Okuda | C09D 11/54 347/21 |
| 2016/0222238 | A1* | 8/2016 | Arai | C09D 11/102 |
| 2017/0158900 | A1* | 6/2017 | Willems | B41J 2/2114 |
| 2017/0166767 | A1* | 6/2017 | Watanabe | C09D 11/54 |
| 2017/0247561 | A1* | 8/2017 | Nakagawa | B41J 11/0015 |
| 2017/0297347 | A1* | 10/2017 | Torisaka | B41J 2/0057 |
| 2018/0265727 | A1* | 9/2018 | Matsuzaki | C09D 11/10 |
| 2018/0281492 | A1* | 10/2018 | Matsuzaki | B41M 5/0017 |
| 2018/0282564 | A1* | 10/2018 | Matsuzaki | C09D 11/38 |
| 2018/0304617 | A1* | 10/2018 | Ohnishi | B41M 5/00 |
| 2018/0326756 | A1* | 11/2018 | Hirokawa | C09D 11/322 |
| 2019/0077981 | A1* | 3/2019 | Uotome | B41J 2/01 |
| 2019/0255869 | A1* | 8/2019 | Asakawa | C09D 11/033 |

FOREIGN PATENT DOCUMENTS

| | | |
|---|---|---|
| JP | 2005-074656 A | 3/2005 |
| JP | 2007-168252 A | 7/2007 |
| JP | 2013-188958 A | 9/2013 |
| JP | 2015-186879 A | 10/2015 |
| WO | WO 2017/119049 A1 * | 7/2017 |

OTHER PUBLICATIONS

Surfynol DF-110D Technical Data Sheet, from Evonik Resource Efficiency GmBH, no date available; https://www.productcenter.coating-additives.com/pdf/daten/engl/SURFYNOL_DF-110_D.pdf; 1 page.*

* cited by examiner

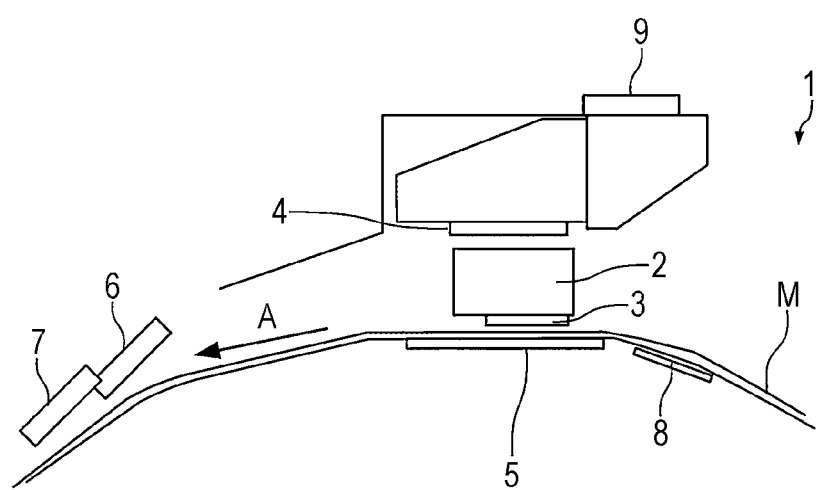

REACTION LIQUID AND RECORDING METHOD

BACKGROUND

1. Technical Field

The present invention relates to a reaction liquid and a recording method.

2. Related Art

An ink jet recording method for ejecting minute ink droplets from a nozzle of an ink jet head of an ink jet recording apparatus to record an image on a recording medium is known and the use thereof in the fields of sign printing and label printing is also being researched. The use of an aqueous ink composition (also referred to below as "an aqueous ink" or "an ink") as ink is being researched from the viewpoints of the global environment, safety for human bodies, and the like.

Here, when an image is recorded on a recording medium with a low ink absorbing property (for example, art paper or coated paper) or a recording medium with an ink non-absorbing property (for example, a plastic film) using an aqueous ink composition, there is a technique for improving the image quality without increasing the primary heating temperature by fixing the ink at an early stage using a reaction liquid which aggregates the components of the ink composition (refer to, for example, JP-A-2005-74656).

However, in recorded images obtained using the reaction liquid, particularly in an intermediate duty region, problems occurred in that pinholes (white spots) were generated in the recorded images. These pinholes are minute regions in which the ink did not wet and spread on the recording medium and was not attached thereto, and in particular, when pinholes are formed on a transparent recording medium, this causes a remarkable deterioration in image quality.

As a cause of the generation of pinholes, it is considered that, for example, when a reaction liquid is coated on a recording medium, minute regions (reaction liquid non-attaching regions or reaction liquid pinholes) to which a reaction liquid is not attached are formed, and the wetting and spreading of the attached ink is not sufficient in that region. In addition, even in a case where the reaction liquid attaches to the recording medium and wetting and spreading occur, a phenomenon in which the reaction liquid repels the ink on the recording medium when the ink is dried is also observed and it is considered that this phenomenon is also a cause of pinholes.

On the other hand, when the surfactant content in the reaction liquid is increased for the purpose of sufficiently coating and spreading the reaction liquid on the recording medium and the reaction liquid pinholes are not formed, turbidity or separation of the reaction liquid is seen, and the storage stability of the reaction liquid tends to be lowered.

SUMMARY

An advantage of some aspects of the invention is to provide a reaction liquid with which the generation of pinholes is suppressed and which has excellent storage stability, and a recording method in which the generation of pinholes is suppressed.

The invention can be realized in the following aspects or application examples.

Application Example 1

According to this application example, there is provided a reaction liquid to be attached to a recording medium to which an ink composition is to be attached, the reaction liquid including an aggregating agent which aggregates components of the ink composition, water, and a surfactant, in which a content of the surfactant is 2% by mass or more and 10% by mass or less with respect to a total mass of the reaction liquid.

According to the application example described above, by setting the content of the surfactant with respect to the total mass of the reaction liquid to 2% by mass or more and 10% by mass or less, the reaction liquid has excellent storage stability and, in addition, the reaction liquid wets and spreads uniformly on the recording medium such that reaction liquid non-attaching regions are decreased. In addition, even in a case where the ink attaches to a reaction liquid non-attaching region and the ink composition and the reaction liquid do not come into direct contact with each other, the adjacent ink comes into contact and mixes with the reaction liquid to make wetting and spreading possible even in the region where the ink composition is not attached. Furthermore, the content of the surfactant being within the above range makes cissing less likely to occur during drying of the ink composition and makes pinholes less likely to be generated. Due to this, it is possible to provide a reaction liquid which suppresses the generation of pinholes and which has excellent storage stability.

Application Example 2

In the reaction liquid according to the application example described above, a nonionic surfactant may be included as the surfactant.

According to the application example described above, including a nonionic surfactant as a surfactant makes it possible to obtain a reaction liquid which suppresses the generation of pinholes and which has excellent storage stability.

Application Example 3

In the reaction liquid according to the application example described above, one kind or more selected from a silicone-based surfactant, an acetylene glycol-based surfactant, and a fluorine-based surfactant may be included as the surfactant.

According to the application example described above, including one or more kinds selected from a silicone-based surfactant, an acetylene glycol-based surfactant, and a fluorine-based surfactant as a surfactant makes it possible to obtain a reaction liquid which suppresses the generation of pinholes and which has excellent storage stability.

Application Example 4

In the reaction liquid according to the application example described above, the content of the surfactant may be 3% by mass or more and 7% by mass or less.

According to the application example described above, the content of the surfactant being 3% by mass or more and 7% by mass or less makes it possible to obtain a reaction liquid which suppresses the generation of pinholes and which has excellent storage stability.

Application Example 5

In the reaction liquid according to the application example described above, the reaction liquid may include one kind or more selected from a polyvalent metal salt, a cationic polymer, and an organic acid as an aggregating agent.

According to the application example described above, including any one kind or more selected from a polyvalent metal salt, a cationic polymer, and an organic acid as an aggregating agent included in the reaction liquid reduces bleeding and improves image quality.

Application Example 6

In the reaction liquid according to the application example described above, the reaction liquid may include an organic solvent having a standard boiling point of 160° C. or higher and 280° C. or lower.

According to the application example described above, including an organic solvent having a standard boiling point of 160° C. or higher and 280° C. or lower makes it possible to obtain a reaction liquid which suppresses the generation of pinholes and which has excellent storage stability.

Application Example 7

In the reaction liquid according to the application example described above, the reaction liquid may be attached to the recording medium using an ink jet method.

According to the application example described above, attaching the reaction liquid to the recording medium using an ink jet method reduces reaction liquid non-attaching regions by uniformly wetting and spreading the reaction liquid on the recording medium, thus, it is possible to suppress the generation of pinholes.

Application Example 8

According to this application example, there is provided a recording method including attaching the ink composition to a recording medium, and attaching the reaction liquid according to any one of Application Example 1 to Application Example 7 to the recording medium.

According to the application example described above, using a reaction liquid in which the content of the surfactant with respect to the total mass of the reaction liquid is 2% by mass or more and 10% by mass or less reduces reaction liquid non-attaching regions by uniformly wetting and spreading the reaction liquid on the recording medium. In addition, even in a case where the ink is attached to the reaction liquid non-attaching region and the ink composition and the reaction liquid do not come into direct contact with each other, the adjacent ink comes into contact and mixes with the reaction liquid to make wetting and spreading possible even to a portion to which the ink composition is not attached. Furthermore, the content of the surfactant being within the above range makes cissing less likely to occur during drying of the ink composition and makes pinholes less likely to be generated. From the above, it is possible to provide a recording method in which the generation of pinholes is suppressed.

Application Example 9

In the recording method according to the application example described above, the ink composition may include a pigment, fine resin particles, and a surfactant, and a content S1 of a surfactant included in the reaction liquid and a content S2 of a surfactant contained in the ink composition may have a relationship of S1/S2=1.5 or more and 10 or less on a mass basis.

According to the application example described above, the ink composition including the pigment and the fine resin particles makes it possible to obtain recorded matter excellent in water resistance, abrasion resistance, and coloring property, and, in addition, reducing the surfactant content in the ink composition reduces bleeding and improves image quality, and, along with this, improves the water resistance and abrasion resistance of the obtained recorded matter. Furthermore, the relationship of S1/S2=1.5 or more and 10 or less makes it possible to suppress the generation of pinholes.

Application Example 10

In the recording method according to the application example described above, the recording medium may be a non-absorbing recording medium or a low-absorption recording medium.

According to the application example described above, it is possible to provide a recording method in which the generation of pinholes is suppressed even in a case where the recording medium is a non-absorbing recording medium or a low-absorption recording medium.

Application Example 11

In the recording method according to the application example described above, when the ink composition and the reaction liquid are respectively attached to the recording medium, surface temperatures of the recording medium may respectively be 45° C. or lower.

According to the application example described above, the surface temperatures of the recording medium at the time of attaching the ink composition and the reaction liquid to the recording medium being 45° C. or lower improves the ejection reliability.

Application Example 12

In the recording method according to the application example described above, the ink composition may be attached in a state where a solvent component of the reaction liquid remains on the recording medium.

According to the application example described above, attaching the ink composition with the reaction liquid in a semi-dry state makes the ink composition mix with the reaction liquid such that the wetting and spreading thereof is sufficient, thus, the generation of pinholes is suppressed.

Application Example 13

In the recording method according to the application example described above, in a recording region of the recording medium, there may be a region in which, with respect to an attachment amount of the ink composition to a predetermined region, a ratio of the attachment amount of the reaction liquid to this region is 2% by mass or more and 40% by mass or less.

According to the application example described above, having a region in which, with respect to an attachment amount of the ink composition to a predetermined region, a ratio of the attachment amount of the reaction liquid to this region is 2% by mass or more and 40% by mass or less suppresses the generation of pinholes and reduces bleeding such that the image quality improves and, along with this, improves the water resistance and abrasion resistance of the obtained recorded matter.

Application Example 14

In the recording method according to the application example described above, in the recording region, there may be a region in which, with respect to a total attachment amount of the attachment amount of the ink composition to the predetermined region and the attachment amount of the reaction liquid to the same region, a total amount of a surfactant included in the reaction liquid and a surfactant included in the ink composition is 0.85% by mass or more and 2% by mass or less.

According to the application example described above, having a region in which a total amount of a surfactant included in the reaction liquid and a surfactant included in the ink composition is 0.85% by mass or more and 2% by mass or less suppresses the generation of pinholes and reduces bleeding such that the image quality improves and, along with this, improves the water resistance and abrasion resistance of the obtained recorded matter.

Application Example 15

In the recording method according to the application example described above, the reaction liquid and the ink composition may be attached using an ink jet method and a maximum droplet amount of the ink composition may be greater than a maximum droplet amount of the reaction liquid.

According to the application example described above, the reaction liquid and the ink composition being attached using an ink jet method and a maximum droplet amount of the ink composition being greater than a maximum droplet amount of the reaction liquid suppresses the generation of pinholes and reduces bleeding such that the image quality improves and, along with this, improves the water resistance and abrasion resistance of the obtained recorded matter.

BRIEF DESCRIPTION OF THE DRAWING

The invention will be described with reference to the accompanying drawing, wherein like numbers reference like elements.

The FIGURE is a schematic cross-sectional view schematically showing an ink jet recording apparatus.

DESCRIPTION OF EXEMPLARY EMBODIMENTS

A description will be given below of preferable embodiments of the invention. The embodiments described below explain one example of the invention. In addition, the invention is not limited to the following embodiments, but also includes various modified examples implemented within a scope not changing the gist of the invention.

One embodiment of the reaction liquid according to the present embodiment is a reaction liquid to be attached to a recording medium to which an ink composition is to be attached, the reaction liquid including an aggregating agent which aggregates components of the ink composition, water, and a surfactant, in which a content of the surfactant is 2% by mass or more and 10% by mass or less with respect to a total mass of the reaction liquid.

In addition, another embodiment of the recording method according to the present embodiment is a recording method including attaching the ink composition to a recording medium, and attaching the reaction liquid according to the present embodiment to the recording medium.

A description will be given below of examples of the reaction liquid and the recording method according to the present embodiment in the order of a recording apparatus which performs the recording method, an ink composition (also referred to below as "ink"), a reaction liquid, a recording medium, and a recording method.

In the present specification, "Duty" is a value calculated by Formula (1).

$$\text{Duty (\%)} = \{\text{actual printed dot number}/(\text{vertical resolution} \times \text{horizontal resolution})\} \times 100 \quad (1)$$

(In the formula, "actual printed dot number" is the actual number of printed dots per unit of area, and "vertical resolution" and "horizontal resolution" are the resolution per unit of area respectively.)

1. Each Configuration 1.1. Recording Apparatus

A description will be given of an example of a recording apparatus in which the recording method according to the present embodiment is carried out using an ink jet recording apparatus as an example. Examples of recording apparatuses able to be used for the recording method according to the present embodiment are not limited to ink jet recording apparatuses.

A description will be given below of an ink jet recording apparatus used in the present embodiment using an on-carriage type printer in which a cartridge is mounted on a carriage as an example, but the ink jet recording apparatus is not limited to an on-carriage type printer and may be an off-carriage type printer in which a cartridge is fixed to the outside without being mounted on a carriage.

In addition, the printer used in the following description is an ink jet recording apparatus provided with a serial type ink jet head which is an ink jet head mounted on a carriage which moves in a predetermined direction, and in which liquid droplets are ejected onto a recording medium by moving the head along with the movement of the carriage; however, in the present embodiment, the recording apparatus is not limited thereto and the printer may be an ink jet recording apparatus provided with a line type ink jet head where the head is formed to be wider than the width of the recording medium and liquid droplets are ejected onto a recording medium without moving the print head.

More specifically, an ink jet recording apparatus provided with a serial type ink jet head performs recording by performing scanning (passes) which eject an ink composition while moving an ink jet head for recording relatively with respect to a recording medium. Specific examples of a serial type ink jet head include an ink jet head in which one or a plurality of ink jet heads are mounted on a carriage which moves in the width direction (direction intersecting a transport direction A of the recording medium) of the recording medium and in which liquid droplets are ejected onto the recording medium by moving the ink jet head along with the movement of the carriage.

On the other hand, an ink jet recording apparatus provided with a line type ink jet head performs recording by performing one scanning (pass) in which the ink composition is ejected while moving the ink jet head for recording relatively with respect to the recording medium. Specific examples of a line type ink jet head include an ink jet head in which the ink jet head is formed to be wider than the width of the recording medium and the ink jet head ejects droplets on the recording medium without moving the recording head.

In the FIGURE used for the following description, the scale of each member is appropriately changed in order to make each member a recognizable size.

The FIGURE is a schematic cross-sectional view schematically showing an ink jet recording apparatus. As shown in the FIGURE, an ink jet recording apparatus 1 is provided with a carriage 2, an ink jet head 3, an IR heater 4, a platen heater 5, a curing heater 6, a cooling fan 7, a preheater 8, and a ventilation fan 9. The ink jet recording apparatus 1 is provided with a control unit (not shown), and the entire operation of the ink jet recording apparatus 1 is controlled by the control unit.

The ink jet head 3 is mounted on the carriage 2 and a cartridge (not shown) filled with ink or reaction liquid is also detachably mounted thereon.

The ink jet head 3 is a unit for ejecting and attaching ink or a reaction liquid onto a recording medium M. One or a plurality of the ink jet heads 3 are mounted on the carriage 2 which moves in the width direction of the recording medium M, that is, in a direction (main operation direction) intersecting the transport direction A of the recording medium M in the FIGURE, and droplets of the ink or the reaction liquid are ejected and attached on the recording medium by the movement of the ink jet head 3 along with the movement of the carriage 2.

Examples of a method for ejecting ink or a reaction liquid from a nozzle include a method (electrostatic suction method) in which a strong electric field is applied between a nozzle and an accelerating electrode placed in front of the nozzle, droplet-shaped ink is continuously ejected from the nozzle, and ink droplets are ejected corresponding to a recording information signal while flying between deflection electrodes; a method in which pressure is applied to the ink by a small pump and the nozzle is mechanically vibrated by a crystal oscillator or the like to forcibly eject ink droplets; a method (piezo method) in which pressure is applied to ink by a piezoelectric element at the same time as a recording information signal and the ink droplets are ejected and recorded; a method (thermal jet method) in which ink is heated and foamed by a microelectrode according to a recording information signal and ink droplets are ejected and recorded, and the like.

The ink jet recording apparatus 1 is provided with an IR heater 4 and a platen heater 5 (primary heating or primary drying) for heating the recording medium M at the time of ejecting the ink composition from the ink jet head 3. In the present embodiment, in the ink composition attaching step described below, it is sufficient to use at least one of the IR heater 4 and the platen heater 5 when heating the recording medium M.

Using the IR heater 4 makes it possible to heat the recording medium M from the ink jet head 3 side. Due to this, although the ink jet head 3 is also easily heated at the same time, it is possible to raise the temperature of the surface of the recording medium M without being influenced by the thickness of the recording medium M, in comparison with a case where the recording medium M is heated from the rear side, such as with the platen heater 5. In addition, when the platen heater 5 is used when heating the recording medium M, it is possible to heat the recording medium M from the side opposite to the ink jet head 3 side. Due to this, it is relatively difficult for the ink jet head 3 to be heated.

The upper limit of the surface temperature of the recording medium M according to the IR heater 4 and the platen heater 5 is preferably 45° C. or lower, more preferably 40° C. or lower, even more preferably 38° C. or lower, and yet more preferably 35° C. or lower. In addition, the lower limit of the surface temperature of the recording medium M is preferably 25° C. or higher, more preferably 30° C. or higher, and even more preferably 32° C. or higher. Due to this, since radiation heat received from the IR heater 4 and the platen heater 5 is reduced or not received, it is possible to suppress drying and composition variations of the ink composition in the ink jet head 3 and fine resin particles, wax, and the like are suppressed from being deposited on the inner wall of the ink jet head 3. In addition, it is possible to fix the ink at an early stage and to improve image quality.

The curing heater 6 is for drying and solidifying the ink composition attached to the recording medium M (secondary heating or secondary drying). The curing heater 6 heating the recording medium M on which the image is recorded scatters and evaporates moisture or the like included in the ink composition more quickly to form the ink film using the fine resin particles included in the ink composition. In this manner, the ink film firmly fixes (attaches) to the recording medium M, the film forming property is excellent, and it is possible to obtain a high-quality image excellent in abrasion resistance in a short time. The upper limit of the surface temperature of the recording medium M according to the curing heater 6 is preferably 120° C. or lower, more preferably 100° C. or lower, and even more preferably 90° C. or lower. In addition, the lower limit of the surface temperature of the recording medium M is preferably 60° C. or higher, more preferably 70° C. or higher, and even more preferably 80° C. or higher. The temperature being within the above range makes it possible to obtain a high-quality image in a short time.

The ink jet recording apparatus 1 may have a cooling fan 7. After the ink composition recorded on the recording medium M is dried, the ink composition on the recording medium M is cooled by the cooling fan 7, such that it is possible to form an ink coating with good adhesion on the recording medium M.

In addition, the ink jet recording apparatus 1 may be provided with the preheater 8 which heats (preheats) the recording medium M in advance before the ink composition or the reaction liquid is attached to the recording medium M. Furthermore, the recording apparatus 1 may be provided with a ventilation fan 9 such that the ink composition or reaction liquid attached to the recording medium M is more efficiently dried.

1.2. Ink Composition

Next, a detailed description will be given of the components included in and able to be included in the ink composition used in the recording method according to the present embodiment.

Here, the ink composition in the present embodiment is preferably an aqueous ink jet ink composition. Here, the "aqueous" ink-jet ink composition in the invention is a composition which has water as a main solvent and which does not have an organic solvent as a main solvent.

1.2.1. Coloring Material

In the present embodiment, the ink composition includes a coloring material. The coloring material includes a component which is able to react with the reaction liquid.

It is possible to use both a dye and a pigment as the coloring material, but a pigment is preferably used due to having a property of being resistant to discoloration due to light, gas, and the like. Images formed on a recording medium using pigments are not only excellent in image quality but also excellent in water resistance, abrasion resistance, gas resistance, light fastness, and the like and good in storability. These properties are remarkable particularly in a case of being formed on a recording medium which is non-ink absorbing or low absorption.

The pigments usable in the present embodiment are not particularly limited, and examples thereof include inorganic pigments and organic pigments. As the inorganic pigment, in addition to titanium oxide and iron oxide, it is possible to use carbon black produced by a known method such as a contact method, a furnace method, or a thermal method. On the other hand, as the organic pigment, it is possible to use azo pigments (including azo lake, insoluble azo pigments, condensed azo pigments, chelate azo pigments, and the like), polycyclic pigments (for example, phthalocyanine pigments, perylene pigments, perinone pigments, anthraquinone pigments, quinophthalone pigments, and the like), nitro pigments, nitroso pigments, aniline black, and the like.

Among specific examples of pigments usable in the present embodiment, carbon black is an example of a black pigment, and the carbon black is not particularly limited, and examples thereof include furnace black, lamp black, acetylene black, channel black, or the like (C.I. Pigment Black 7), and examples of commercial products include No. 2300, 900, MCF 88, No. 20B, No. 33, No. 40, No. 45, No. 52, MA 7, MA 8, MA 77, MA 100, No. 2200B, and the like (the above are trade names manufactured by Mitsubishi Chemical Corp.), Color black FW 1, FW 2, FW 2V, FW 18, FW 200, S 150, S 160, S 170, Printex 35, U, V, 140 U, special black 6, 5, 4A, 4, 250, and the like (the above are trade names manufactured by Degussa), Conductex SC, Raven 1255, 5750, 5250, 5000, 3500, 1255, 700, and the like (the above are trade names manufactured by Columbia Carbon), and Regal 400R, 330R, 660R, Mogul L, Monarch 700, 800, 880, 900, 1000, 1100, 1300, 1400, Elftex 12, and the like (the above are trade names manufactured by Cabot Corp.).

The white pigment is not particularly limited, and examples thereof include white inorganic pigments of C.I. Pigment White 6, 18, 21, titanium oxide, zinc oxide, zinc sulfide, antimony oxide, magnesium oxide, and zirconium oxide. In addition to the white inorganic pigment, it is also possible to use white organic pigments such as white hollow resin particles and polymer particles.

The pigment used for the yellow ink is not particularly limited, and examples thereof include C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, and 180.

The pigment used for the magenta ink is not particularly limited, and examples thereof include C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48 (Ca), 48 (Mn), 57 (Ca), 57:1, 88, 112, 114, 122, 123, 144, 146, 149, 150, 166, 168, 170, 171, 175, 176, 177, 178, 179, 184, 185, 187, 202, 209, 219, 224, 245 or C.I. Pigment Violet 19, 23, 32, 33, 36, 38, 43, and 50.

The pigment used for the cyan ink is not particularly limited, and examples thereof include C.I. Pigment Blue 1, 2, 3, 15, 15:1, 15:2, 15:3, 15:34, 15:4, 16, 18, 22, 25, 60, 65, 66; C.I. Vat Blue 4, and 60.

In addition, pigments used for color inks other than magenta, cyan, and yellow are not particularly limited, and examples thereof include C.I. Pigment Green 7, 10, C.I. Pigment Brown 3, 5, 25, 26, C.I. Pigment Orange 1, 2, 5, 7, 13, 14, 15, 16, 24, 34, 36, 38, 40, 43, and 63.

The pearl pigment is not particularly limited, but examples thereof include pigments having pearly luster and interference gloss such as titanium dioxide-coated mica, fish scale foil, bismuth oxychloride, and the like.

The metallic pigment is not particularly limited, but examples thereof include particles made of a simple substance or an alloy such as aluminum, silver, gold, platinum, nickel, chromium, tin, zinc, indium, titanium, and copper.

The content of the pigment included in the ink composition is preferably 0.1% by mass or more and 15% by mass or less with respect to the total mass (100% by mass) of the ink composition, more preferably 0.5% by mass or more and 10% by mass or less, and even more preferably 1.0% by mass and 7% by mass or less.

In order to apply the pigment described above to the ink composition, it is necessary to stably disperse and hold the pigment in water. Examples of the method include a method for dispersing with a dispersant resin such as a water-soluble resin and/or a water-dispersible resin (the pigment dispersed by this method is referred to below as a "resin-dispersed pigment"), a method for dispersing with a surfactant of a water-soluble surfactant and/or a water-dispersible surfactant (a pigment dispersed by this method is referred to below as a "surfactant-dispersed pigment"), a method in which a hydrophilic functional group is chemically and physically introduced to the surface of the pigment particle so as to be able to be dispersed and/or dissolved in water without a dispersant such as the resin or the surfactant (a pigment dispersed by this method is referred to below as a "surface-treated pigment"), and the like. In the present embodiment, it is possible to use any one of a resin-dispersed pigment, a surfactant-dispersed pigment, and a surface-treated pigment as the ink composition, and it is also possible to use a mixture of a plurality of kinds thereof as necessary.

Examples of the dispersant resin used in the resin-dispersed pigment include polyvinyl alcohols, polyvinyl pyrrolidones, polyacrylic acid, acrylic acid-acrylonitrile copolymers, vinyl acetate-acrylic acid ester copolymers, acrylic acid-acrylic acid ester copolymers, styrene-acrylic acid copolymers, styrene-methacrylic acid copolymers, styrene-methacrylic acid-acrylic acid ester copolymers, styrene-α-methylstyrene-acrylic acid copolymer, styrene-α-methylstyrene-acrylic acid-acrylic acid ester copolymers, styrene-maleic acid copolymers, styrene-maleic anhydride copolymers, vinyl naphthalene-acrylic acid copolymers, vinyl naphthalene-maleic acid copolymers, vinyl acetate-maleic acid ester copolymers, vinyl acetate-crotonic acid copolymers, vinyl acetate-acryl acid copolymers, and the like and salts thereof. Among these, in particular, a copolymer of a monomer having a hydrophobic functional group and a monomer having a hydrophilic functional group, and a polymer formed of a monomer having both a hydrophobic functional group and a hydrophilic functional group are preferable. As the form of the copolymer, it is possible to use any form of a random copolymer, a block copolymer, an alternating copolymer, and a graft copolymer.

Examples of salts include salts of basic compounds such as ammonia, ethylamine, diethylamine, triethylamine, propylamine, isopropylamine, dipropylamine, butylamine, isobutylamine, diethanolamine, triethanolamine, tri-iso-propanolamine, aminomethylpropanol, and morpholine. The addition amount of these basic compounds is not particularly limited as long as the addition amount is the neutralization equivalent or more of the dispersant resin described above.

The molecular weight of the dispersant resin described above is preferably in the range of 1,000 to 100,000 as the mass average molecular weight, and more preferably in the range of 3,000 to 10,000. By the molecular weight being within the above range, a stable dispersion of the coloring material in water is obtained, and viscosity control and the like at the time of application to the ink composition are easy.

It is also possible to use commercial products as the dispersant resin described above. Specific examples thereof include Joncryl 67 (mass average molecular weight: 12,500, acid value: 213), Joncryl 678 (mass average molecular weight: 8,500, acid value: 215), Joncryl 586 (mass average molecular weight: 4,600, acid value: 108), Joncryl 611 (mass average molecular weight: 8,100, acid value: 53), Joncryl 680 (mass average molecular weight: 4,900, acid value: 215), Joncryl 682 (mass average molecular weight: 1,700, acid value: 238), Joncryl 683 (mass average molecular weight: 8,000, acid value: 160), Joncryl 690 (mass average molecular weight: 16,500, acid value: 240) (the above are trade names manufactured by BASF Japan Ltd.), and the like.

In addition, examples of the surfactant used for the surfactant-dispersed pigment include anionic surfactants such as alkane sulfonate, α-olefin sulfonate, alkylbenzene sulfonate, alkyl naphthalene sulfonate, acyl methyl taurate, dialkyl sulfosuccinate, alkylsulfuric acid ester salts, sulfated olefins, polyoxyethylene alkyl ether sulfuric acid ester salts, alkylphosphoric acid ester salts, polyoxyethylene alkyl ether phosphoric acid ester salts, and monoglyceride phosphoric acid ester salts, amphoteric surfactants such as alkylpyridinium salts, alkylamino acid salts, and alkyl dimethyl betaine, and nonionic surfactants such as polyoxyethylene alkyl ether, polyoxyethylene alkyl phenyl ether, polyoxyethylene alkyl ester, polyoxyethylene alkylamide, glycerine alkyl esters, and sorbitan alkyl esters.

The addition amount of the dispersant resin or the surfactant described above to the pigment is preferably 1 part by mass to 100 parts by mass with respect to 100 parts by mass of the pigment, and more preferably 5 parts by mass to 50 parts by mass. Within this range, it is possible to secure the dispersion stability of the pigment in water.

In addition, examples of surface-treated pigments include, as a hydrophilic functional group, —OM, —COOM, —CO—, —SO$_3$M, —SO$_2$NH$_3$, —RSO$_3$M, —PO$_3$HM, —PO$_3$M$_3$, —SO$_3$NHCOR, —NH$_3$, —NR$_3$ (here, M in the formula represents a hydrogen atom, an alkali metal, ammonium, or organic ammonium, and R indicates an alkyl group having 1 to 12 carbon atoms, a phenyl group which may have a substituent, or a naphthyl group which may have a substituent), and the like. These functional groups are physically and/or chemically introduced by grafting directly and/or via other groups on the pigment particle surface. Examples of polyvalent groups include an alkylene group having 1 to 12 carbon atoms, a phenylene group which may have a substituent, a naphthylene group which may have a substituent, and the like.

In addition, as the surface-treated pigment, a pigment is preferable which is surface treated such that —SO$_3$M and/or —RSO$_3$M (M is a counter ion and indicates a hydrogen ion, alkali metal ion, ammonium ion, or organic ammonium ion) is chemically bonded to the pigment particle surface using a treating agent including sulfur, that is, a pigment is preferable which does not have active protons, which has no reactivity with sulfonic acid, and which is dispersed in a solvent in which the pigment is insoluble or poorly soluble, and which is then subjected to a surface treatment such that —SO$_3$M and/or —RSO$_3$M is chemically bonded to the particle surface with amidosulfuric acid or a complex of sulfur trioxide and a tertiary amine such that the pigment is dispersible and/or dissolvable in water.

As a surface treatment unit for grafting the functional group or a salt thereof onto the surface of the pigment particle directly or via a polyvalent group, it is possible to apply various known surface treatment units. Examples of the unit include a unit for applying ozone or a sodium hypochlorite solution to commercially available oxidized carbon black and subjecting the carbon black to a further oxidization treatment to further hydrophilize the surface thereof (for example, JP-A-7-258578, JP-A-8-3498, JP-A-10-120958, JP-A-10-195331, and JP-A-10-237349), a unit for treating carbon black with 3-amino-N-alkyl substituted pyridium bromide (for example, JP-A-10-195360 and JP-A-10-330665), a unit for dispersing an organic pigment in a solvent in which the organic pigment is insoluble or poorly soluble, and introducing a sulfone group onto the surface of the pigment particle using a sulfonating agent (for example, JP-A-8-283596, JP-A-10-110110, and JP-A-10-110111), a unit for dispersing an organic pigment in a basic solvent which forms a complex with sulfur trioxide, treating the surface of an organic pigment by adding sulfur trioxide, and introducing a sulfone group or a sulfonamino group (for example, JP-A-10-110114), and the like; however, the unit for preparing the surface-treated pigment used in the invention is not limited to these units.

One or a plurality of functional groups may be grafted to one pigment particle. The kind and degree of the functional group to be grafted may be appropriately determined in consideration of the dispersion stability in the ink, the color density, the drying property on the front face of the ink jet head, and the like.

As methods of dispersing the resin-dispersed pigment, the surfactant-dispersed pigment, and the surface-treated pigment in water, a pigment, water, and a dispersant resin are added for the resin-dispersed pigment, a pigment, water, and a surfactant are added for the surfactant-dispersed pigment, a surface-treated pigment and water are added for the surface-treated pigment, and a water-soluble organic solvent/neutralizing agent and the like are added to each as necessary, and it is possible to carry out the method in a dispersing machine used in the related art such as a ball mill, a sand mill, an attritor, a roll mill, an agitator mill, a Henschel mixer, a colloid mill, an ultrasonic homogenizer, a jet mill, an Ang mill, or the like. In such a case, regarding the particle diameter of the pigment, the dispersion is performed with an average particle diameter in a range of 20 nm and 500 nm and more preferably in a range of 50 nm and 200 nm, which is preferable from the viewpoint of securing the dispersion stability of the pigment in water.

1.2.2. Fine Resin Particles

In the present embodiment, the ink composition preferably contains fine resin particles. Fine resin particles are components which are able to react with the reaction liquid.

In the present embodiment, in the fine resin particles, a resin which is poorly soluble or insoluble in the solvent of the ink composition used in the present embodiment is dispersed as fine particles (that is, in an emulsion state or a suspension state), also referred to as a "binder solid" or a "resin emulsion".

The fine resin particles used in the present embodiment are not particularly limited, but in addition to the resin used as the dispersant resin described above, examples thereof include homopolymers or copolymers of (meth)acrylic acid, (meth)acrylic acid ester, acrylonitrile, cyanoacrylate, acrylamide, olefin, styrene, vinyl acetate, vinyl chloride, vinyl alcohol, vinyl ether, vinylpyrrolidone, vinylpyridine, vinylcarbazole, vinylimidazole, and vinylidene chloride, fluororesins, and natural resins. Among these, acrylic resins which are homopolymers or copolymers of at least one of (meth)acrylic monomers such as (meth)acrylic acid, (meth) acrylic acid ester, acrylonitrile, and cyanoacrylate are preferable. Among acrylic resins, copolymers of (meth)acrylic monomers and vinyl monomers are preferable. The vinyl monomers are not limited and examples thereof include styrene and the like, and a styrene-acrylic copolymer-based resin which is a copolymer of a (meth)acrylic monomer and styrene is particularly preferable. The copolymer described above may be in any form of a random copolymer, a block copolymer, an alternating copolymer, or a graft copolymer. In addition, as the resin, in addition to the above, polyurethane resins, polyester resins, and polyether resins are preferably used.

In addition, the fine resin particles may be a linear or branched polymer, or a three-dimensionally cross-linked polymer.

In order to obtain the resin described above in a fine particle state, the methods shown below may be used, any of these methods may be used, and a plurality of methods may be combined as necessary. Examples of the method include a method in which a polymerization catalyst (polymerization initiator) and a dispersant are mixed and polymerized (that is, emulsion polymerization) in a monomer forming a desired resin; a method in which a resin having a hydrophilic moiety is dissolved in a water-soluble organic solvent and this solution is mixed in water and then the water-soluble organic solvent is removed by distillation or the like, a method in which a resin is dissolved in a water-insoluble organic solvent and this solution is mixed with a dispersant in an aqueous solution to obtain the resin described above, or the like. It is possible to appropriately select the method described above depending on the type and characteristics of the resin to be used. The dispersant which is able to be used when dispersing the resin is not particularly limited, and examples thereof include anionic surfactants (for example, sodium dodecylbenzenesulfonate, sodium lauryl phosphate, polyoxyethylene alkyl ether sulfate ammonium salt, and the like), nonionic surfactants (for example, polyoxyethylene alkyl ethers, polyoxyethylene alkyl esters, polyoxyethylene sorbitan fatty acid esters, polyoxyethylene alkyl phenyl ethers, and the like), and the above may be used singly or in a mixture of two or more.

In a case where the resin as described above is used in a fine particle state (emulsion state or suspension state), it is also possible to use resins obtained by known materials and methods. For example, those described in JP-B-62-1426, JP-A-3-56573, JP-A-3-79678, JP-A-3-160068, JP-A-4-18462, and the like may be used. In addition, it is also possible to use commercially available products, and examples thereof include Microgel E-1002, Microgel E-5002 (the above are trade names, manufactured by Nippon Paint Co., Ltd.), Boncoat 4001, Boncoat 5454 (the above are trade names, manufactured by DIC Corp.), SAE 1014 (trade name, manufactured by Zeon Corp.), Cybinol SK-200 (trade name, manufactured by Saiden Chemical Industry Co., Ltd.), Jurimer AT-613 (trade name, manufactured by Toagosei Co., Ltd.), Vinyblan 700 (trade name, manufactured by Nissin Chemical Co., Ltd.), Joncryl 7100, Joncryl 390, Joncryl 711, Joncryl 511, Joncryl 7001, Joncryl 632, Joncryl 741, Joncryl 450, Joncryl 840, Joncryl 74J, Joncryl HRC-1645J, Joncryl 734, Joncryl 852, Joncryl 7600, Joncryl 775, Joncryl 537 J, Joncryl 1535, Joncryl PDX-7630A, Joncryl 352J, Joncryl 352D, Joncryl PDX-7145, Joncryl 538 J, Joncryl 7640, Joncryl 7641, Joncryl 631, Joncryl 790, Joncryl 780, Joncryl 7610 (the above are trade names, manufactured by BASF Japan Ltd.), and the like.

The fine resin particles may include a composite resin. The composite resin is formed of two or more kinds of resins which are different from each other in the composition (at least one of the kind and content ratio) of the monomer components forming the resin as the resin performing the fixing, and it does not matter which part of the fine resin particles is formed by the two or more kinds of resins. The two or more kinds of resins are not limited to kinds in which the resin compositions are able to be distinguished in a non-continuous manner at the boundary, and the composition of the monomer components may be different in a continuous manner.

In particular, a case of using a core-shell resin as the fine resin particles, in which one of two or more kinds of resins is used as a core resin and the other as a shell resin, and the core resin is a resin which mainly forms the central section of the fine resin particles, and the shell resin is a resin which mainly forms the peripheral section of the fine resin particles, is preferable in terms of being able to change the characteristics of each of the resins in the peripheral section and the central section of the resins. In such a case, the shell resin may form at least a part of the peripheral section of the fine resin particles. Here, the core-shell resin is described as an example of the composite resin, but the composite resin is not limited to a core-shell resin, and the same effects are able to be obtained as long as the resin is a composite resin. The core-shell resin is preferable in terms of being able to easily adjust the solubility of the resin since it is possible to independently control the degree of cross-linking and the glass transition temperature for the core and the shell.

In addition, even in a resin which is not a core-shell resin, it is possible to adjust the dissolution time depending on the glass transition temperature and the degree of cross-linking of the resin. Furthermore, without being limited to the glass transition temperature and the degree of cross-linking, it is also possible to carry out adjustment according to the composition, such as the kinds and amounts of monomers used for resin synthesis.

From the viewpoint of ensuring the storage stability and ejection reliability of the ink composition in a case of using the fine resin particles in the state of fine particles, the average particle diameter thereof is preferably in a range of 5 nm or more and 400 nm or less, and more preferably in a range of 50 nm or more and 200 nm or more. The average particle diameter of the fine resin particles being in the above range makes the film forming property excellent and makes it hard to form large lumps even when aggregated, thus, it possible to reduce nozzle clogging. The average particle diameter in this specification is on a volume basis unless otherwise specified. As a measuring method, for example, it is possible to carry out the measuring using a particle diameter distribution measuring apparatus using dynamic light scattering theory as a measurement principle. An example of such a particle diameter distribution measuring apparatus is "Microtrac UPA" manufactured by Nikkiso Co., Ltd.

The glass transition temperature (Tg) of the fine resin particles is, for example, preferably −20° C. or higher and 100° C. or lower, more preferably −10° C. or higher and 80° C. or lower, and even more preferably 0° C. or higher and 76° C. or lower.

The lower limit of the content of the fine resin particles is preferably 0.1% by mass or more with respect to the total mass (100% by mass) of the ink composition in terms of solid content, more preferably 0.5% by mass or more, even more preferably 2% by mass or more, and particularly preferably 4% by mass or more. In addition, the upper limit of the content of the resin is preferably 15% by mass or less with respect to the total mass (100% by mass) of the ink composition, more preferably 12% by mass or less, even more preferably 10% by mass or less, and particularly preferably 8% by mass or less. The content of the fine resin particles being within the above range makes it possible to secure the ejection reliability at the time of recording, and, in particular, to form an image excellent in water resistance and abrasion resistance even on a recording medium with an ink non-absorbing property or low absorbing property.

1.2.3. Water

In the present embodiment, the ink composition preferably contains water. Water is the main medium of the ink composition and is a component that evaporates and scatters when heated. The water is preferably pure water or ultrapure water obtained by removing ionic impurities as much as possible such as ion-exchanged water, ultra-filtered water, reverse osmosis water, or distilled water. In addition, when water sterilized by ultraviolet ray irradiation or addition of hydrogen peroxide or the like is used, it is possible to suppress the generation of fungi and bacteria in a case where pigment dispersion and the ink composition using the same are stored for a long time, which is preferable.

The lower limit of the water content is preferably 50% by mass or more with respect to the total mass (100% by mass) of the ink composition, more preferably 55% by mass or more, and particularly preferably 60% by mass or more. In addition, the upper limit of the water content is preferably 90% by mass or less with respect to the total mass (100% by mass) of the ink composition, more preferably 80% by mass or less, and even more preferably 70% by mass or less.

1.2.4. Organic Solvent

The ink composition in the present embodiment may contain an organic solvent. The ink composition containing an organic solvent gives the ink composition ejected onto the recording medium a good drying property and makes it possible to obtain an image excellent in water resistance and abrasion resistance.

The organic solvent used for the ink composition is not particularly limited and is preferably a water-soluble organic solvent. Using the water-soluble organic solvent stabilizes the dispersion of the ink composition, further improves the drying property of the ink composition, and makes it possible to obtain a printed image excellent in water resistance and abrasion resistance.

Examples of organic solvents are not particularly limited, and examples thereof include alcohols such as methanol, ethanol, and isopropyl alcohol; ketones or ketoalcohols such as acetone and diacetone alcohol; ethers such as tetrahydrofuran and dioxane; glycols such as hexanediol, ethylene glycol, diethylene glycol, triethylene glycol, polyethylene glycol, propylene glycol, dipropylene glycol, tripropylene glycol, polypropylene glycol, propanediol, butanediol, and pentanediol; lower alkyl ethers of glycols such as ethylene glycol monomethyl ether, diethylene glycol monomethyl ether, diethylene glycol monoethyl ether, and diethylene glycol monobutyl ether; amines having a hydroxyl group such as diethanolamine and triethanolamine; and glycerine. Among these, propylene glycol, 1,2-hexanediol, 1,3-butanediol, and the like are preferably used from the viewpoint of improving the drying property of the ink composition.

In addition, in the present embodiment, the organic solvent used in the ink composition preferably includes a nitrogen-containing solvent in terms of having high resin solubility and being able to obtain a printed image excellent in water resistance and abrasion resistance. Examples of the nitrogen-containing solvent include N-methyl-2-pyrrolidone, N-ethyl-2-pyrrolidone, N-vinyl-2-pyrrolidone, 2-pyrrolidone, N-butyl-2-pyrrolidone, 5-methyl-2-pyrrolidone, and the like.

The lower limit of the content of the organic solvent is preferably 5% by mass or more with respect to the total mass (100% by mass) of the ink composition, more preferably 10% by mass or more, and particularly preferably 15% by mass or more. In addition, the upper limit of the content of the organic solvent is preferably 40% by mass or less with respect to the total mass (100% by mass) of the ink composition, more preferably 35% by mass or less, and even more preferably 30% by mass or less.

The standard boiling point of the organic solvent is preferably 180° C. or higher, more preferably 200° C. or higher, and even more preferably 220° C. or higher. The upper limit of the standard boiling point of the organic solvent is preferably 300° C. or lower, more preferably 280° C. or lower, and even more preferably 250° C. or lower. In a case where the standard boiling point of the organic solvent is within the above ranges, it is preferable in terms of the ejection reliability, water resistance, abrasion resistance, and the like being superior.

Here, an organic solvent having a standard boiling point over 280° C. may absorb moisture of the ink to increase the viscosity of the ink near the ink jet head, which may lower the ejection reliability of the ink jet head. For this reason, in the ink composition in the present embodiment, the content of the organic solvent having a standard boiling point over 280° C. is preferably 3% by mass or less with respect to the total mass (100% by mass) of the ink composition, more preferably 2% by mass or less, even more preferably 1% by mass or less, yet more preferably 0.5% by mass or less, and still more preferably 0.1% by mass or less. In such a case, since the drying property of the ink composition on the recording medium becomes high, it is particularly suitable for recording on a recording medium with a low absorbing property or a non-absorbing recording medium, and it is possible to form an excellent image in which the generation of bleeding is suppressed. In addition, the stickiness of the obtained printed image is reduced, and water resistance and abrasion resistance are excellent.

Examples of an organic solvent having a standard boiling point over 280° C. include glycerine. Glycerine has high hygroscopicity and a high standard boiling point, which may cause clogging and malfunctioning of the ink jet head. In addition, glycerine is poor in antiseptic properties and allows fungi and bacteria to easily propagate, thus, glycerine is preferably not contained in the ink composition.

The lower limit of the content of the organic solvent having a standard boiling point of 280° C. or lower as the organic solvent is preferably 5% by mass or more with respect to the total mass (100% by mass) of the ink composition, more preferably 10% by mass or more, and particularly preferably 15% by mass or more. In addition, the upper limit of the content of the organic solvent having a standard boiling point of 280° C. or lower is preferably 30% by mass or less with respect to the total mass (100% by mass) of the ink composition, more preferably 25% by mass or less, and even more preferably 20% by mass or less. The content of the organic solvent having a standard boiling point of 280° C. or lower being within the above range further improves the dispersion stability of the pigment and the resin component in the ink, the continuous ejection reliability, the filling property (wet spreadability) and permeability of the ink on the recording medium, and drying resistance of the ink.

1.2.5. Surfactant

In the present embodiment, the ink composition preferably contains a surfactant. The surfactant is not particularly limited, and examples thereof include an acetylene glycol-based surfactant, a fluorine-based surfactant, and a silicone-based surfactant, and at least one kind thereof is preferably contained. In addition, from the viewpoints of wettability to the recording medium and a foaming property, it is preferable to use an acetylene glycol-based surfactant or a silicone-based surfactant.

The acetylene glycol-based surfactant is not particularly limited, but preferable examples thereof include one kind or more selected from 2,4,7,9-tetramethyl-5-decyne-4,7-diol and alkylene oxide adducts of 2,4,7,9-tetramethyl-5-decyne-4,7-diol, and 2,4-dimethyl-5-decyn-4-ol and alkylene oxide adducts of 2,4-dimethyl-5-decyn-4-ol. Commercial products of acetylene glycol-based surfactants are not particularly limited, and examples thereof include E series such as Olfine 104 series and Olfine E 1010, Surfynol 465, Surfynol 61, and Surfynol DF 110D (trade name, manufactured by Nissin Chemical Co., Ltd.), and the like. The acetylene glycol-based surfactant may be used singly or in a combination of two or more kinds.

The fluorine-based surfactant is not particularly limited, and examples thereof include perfluoroalkyl sulfonate, perfluoroalkyl carboxylate, perfluoroalkyl phosphate ester, perfluoroalkyl ethylene oxide adduct, perfluoroalkyl betaine, and perfluoroalkyl amine oxide compounds. Commercial products of fluorine-based surfactants are not particularly limited and examples thereof include Surflon 5144, 5145 (the above are trade names, manufactured by AGC Seimi Chemical Co., Ltd.); FC-170C, FC-430, Fluorad-FC 4430 (the above are trade names, manufactured by Sumitomo 3M Ltd.); FSO, FSO-100, FSN, FSN-100, FS-300 (the above are trade names, manufactured by Dupont); FT-250, 251 (the above are trade names, manufactured by Neos Co., Ltd.). The fluorine-based surfactant may be used singly or in a combination of two or more kinds.

The silicone-based surfactant is not particularly limited, and examples thereof include a polysiloxane-based compound, a polyether-modified organosiloxane, and the like. Commercial products of silicone-based surfactants are not particularly limited, but specific examples thereof include BYK-306, BYK-307, BYK-333, BYK-341, BYK-345, BYK-346, BYK-347, BYK-348, and BYK-349 (the above are trade names, manufactured by BYK Additives & Instruments), KF-351 A, KF-352 A, KF-353, KF-354 L, KF-355 A, KF-615 A, KF-945, KF-640, KF-642, KF-643, KF-6020, X-22-4515, KF-6011, KF-6012, KF-6015, and KF-6017 (the above are trade names, manufactured by Shin-Etsu Chemical Co., Ltd.). The silicone-based surfactant may be used singly or in a combination of two or more kinds.

The lower limit of the content of the acetylene glycol-based surfactant, the fluorine-based surfactant, and the silicone-based surfactant is preferably 0.5% by mass or more with respect to the total mass (100% by mass) of the ink composition, and more preferably 0.75% by mass or more. On the other hand, the upper limit of the content is preferably 3% by mass or less, more preferably 2% by mass or less, and particularly preferably 1.5% by mass or less. When the contents of the acetylene glycol-based surfactant, fluorine-based surfactant, and silicone-based surfactant are in the above ranges, the storage stability and wetting and spreading property of the ink are improved, and there is a uniform spreading action so as to not cause density unevenness or bleeding of the ink on the recording medium, which is preferable.

The lower limit of the total content S2 of the surfactant included in the ink is preferably 0.5% by mass or more with respect to the total mass (100% by mass) of the ink composition, more preferably 1% by mass or more, and particularly preferably 1.2% by mass or more. On the other hand, the upper limit of the content is preferably 3% by mass or less, more preferably 2% by mass or less, and particularly preferably 1.5% by mass or less. When the total content S2 is within the above range, the storage stability and wetting and spreading property of the ink are improved.

The content S2 of the surfactant included in the ink is preferably smaller than the content S1 of the surfactant of the reaction liquid described below on a mass basis, and the lower limit of the ratio S1/S2 of S1 and S2 is preferably 1.5 or more, more preferably 2 or more, and even more preferably 2.5 or more. In addition, the upper limit of S1/S2 is preferably 10 or less, more preferably 6 or less, and even more preferably 4 or less. When S1/S2 is within the above range, the generation of pinholes is suppressed, and the abrasion resistance and water resistance are also improved.

1.2.6. Other Components

In the present embodiment, it is possible to appropriately add polyolefin wax or the like in order to improve the durability of printed matter, and it is also possible to appropriately add various additives such as an antifoaming agent, a dissolution agent, a viscosity adjusting agent, a pH adjusting agent, an antioxidant, a preservative, a fungicide, a corrosion inhibitor, a moisturizing agent which is not an organic solvent, a chelating agent for capturing metal ions which affect dispersion in order to satisfactorily maintain the storage stability of the ink composition and the ejection reliability from the ink jet head, in order to improve clogging, or in order to prevent deterioration of the ink.

Examples of pH adjusting agents include potassium dihydrogen phosphate, disodium hydrogen phosphate, sodium hydroxide, lithium hydroxide, potassium hydroxide, ammonia, diethanolamine, triethanolamine, triisopropanolamine, potassium carbonate, sodium carbonate, sodium bicarbonate, and the like.

When polyolefin wax is added, it is possible to improve the slipperiness with respect to physical contact of an image formed on a recording medium with a low absorbing property or a non-absorbing recording medium to reduce the occurrence of image cracking, and to improve the abrasion resistance of the image, which is preferable. The content of the polyolefin wax is preferably 0.01% by mass or more and 10% by mass or less with respect to the total mass of the ink composition, and more preferably 0.1% by mass or more and 1% by mass or less. When the content of the polyolefin wax is within the above range, the effect of improving the abrasion resistance is sufficiently exhibited.

Examples of the polyolefin wax include waxes and copolymers thereof produced from olefins such as ethylene, propylene, and butylene or derivatives thereof, specific examples thereof include polyethylene-based wax, polypropylene-based wax, polybutylene-based wax, and the like, and polyethylene-based wax is preferably used. It is possible to use the polyolefin wax singly or in a combination of two or more kinds. These are preferably used in the form of an aqueous emulsion in which polyolefin wax is dispersed in water by a known method.

As the polyolefin wax, it is possible to use commercially available polyolefin waxes and specific examples thereof include the Chemipearl series such as Chemipearl W 4005

(trade name, manufactured by Mitsui Chemicals, Inc., polyethylene-based wax). Other examples thereof include the AQUACER series such as AQUACER 503, 507, 513, 515, and 840 (trade name, manufactured by BYK Additives & Instruments, polyethylene-based wax), the Hitech series such as Hitech E-7025P, E-2213, E-9460, E-9015, E-4A, E-5403P, and E-8237 (trade name, manufactured by Toho Chemical Industry Co., Ltd.), Nopcoat PEM-17 (trade name, manufactured by San Nopco Ltd., polyethylene emulsion), and the like. The above are commercially available in the form of an aqueous emulsion in which polyolefin wax is dispersed in water by a known method.

Examples of preservatives/fungicides include sodium benzoate, sodium pentachlorophenol, sodium 2-pyridinethiol-1-oxide, sodium sorbate, sodium dehydroacetate, 1,2-dibenzisothiazolin-3-one, and the like. Examples of commercial products include Proxel XL 2, Proxel GXL (the above are trade names, manufactured by Avecia Ltd.), Denicide CSA, NS-500 W (the above are trade names, manufactured by Nagase ChemteX Corp.), and the like.

Examples of rust inhibitors include benzotriazole and the like.

Examples of chelating agents include ethylenediaminetetraacetic acid and salts thereof (disodium ethylenediaminetetraacetate disodium salt, and the like) and the like.

Examples of the moisturizing agent which is not an organic solvent include moisturizing agents which are solid at normal temperature, such as trimethylolpropane and sugar.

1.2.7. Method for Preparing Ink Composition

The ink composition in the present embodiment is obtained by mixing the components described above in a freely chosen order and, as necessary, removing impurities by filtration or the like. As a method for mixing the respective components, a method is suitably used in which materials are sequentially added to a container provided with a stirrer such as a mechanical stirrer or a magnetic stirrer and stirred and mixed. As a filtration method, it is possible to carry out centrifugal filtration, filter filtration, and the like as necessary.

1.2.8. Physical Properties of Ink Composition

In the ink composition in the present embodiment, in a case where ejection is carried out using the ink jet method with the ink jet head, from the viewpoint of balance between image quality and reliability as ink for ink jet recording, the surface tension at 20° C. is preferably 18 mN/m or more and 40 mN/m or less, more preferably 20 mN/m or more and 35 mN/m or less, and even more preferably 22 mN/m or more and 33 mN/m or less. For the measurement of the surface tension, for example, it is possible to carry out measurement by confirming the surface tension when a platinum plate is wetted with ink in an environment of 20° C. using an automatic surface tensiometer CBVP-Z (trade name, manufactured by Kyowa Interface Science Co., Ltd.).

In addition, from the same viewpoint, the viscosity of the ink composition in the present embodiment at 20° C. is preferably 3 mPa·s or more and 10 mPa·s or less, and more preferably 3 mPa·s or more and 8 mPa·s or less. Here, it is possible to measure the viscosity, for example, using a viscoelasticity tester MCR-300 (trade name, manufactured by Physica) in an environment of 20° C.

1.3. Reaction Liquid

Next, a description will be given of the reaction liquid according to the present embodiment.

The reaction liquid according to the present embodiment is a reaction liquid to be attached to a recording medium to which the ink composition is to be attached and includes an aggregating agent for aggregating components of the ink composition, water, and a surfactant, in which the content of the surfactant is 2% by mass or more and 10% by mass or less with respect to the total mass of the reaction liquid.

As described above, in the present embodiment, the reaction liquid is an auxiliary liquid which reacts with the components of the ink composition to aggregate the ink components and which is used by being attached to the recording medium before or after the ink composition is attached.

1.3.1. Aggregating Agent

The reaction liquid according to the present embodiment contains an aggregating agent for aggregating components of the ink composition. Due to the reaction liquid including an aggregating agent, in the ink composition attaching step described below, the aggregating agent and the components such as the coloring material or resin included in the ink composition react quickly. By doing so, since the dispersed state of the coloring material or resin in the ink composition is destroyed, the coloring material and the resin are aggregated, and this aggregate decreases the fluidity of the ink, it is considered excellent in terms of reducing bleeding and improving the image quality of the recorded image.

Examples of aggregating agents include a polyvalent metal salt, a cationic compound (cationic polymer, cationic surfactant, or the like), and an organic acid. These aggregating agents may be used singly or in a combination of two or more kinds. Among these aggregating agents, it is preferable to use at least one kind of aggregating agent selected from the group consisting of a polyvalent metal salt and a cationic polymer from the viewpoint of excellent reactivity with the resin included in the ink composition.

The polyvalent metal salt is formed of divalent or higher polyvalent metal ions and anions bonded to these polyvalent metal ions and is a compound soluble in water. Specific examples of polyvalent metal ions include divalent metal ions such as $Ca^{2+}$, $Cu^{2+}$, $Ni^{2+}$, $Mg^{2+}$, $Zn^{2+}$, $Ba^{2+}$, and the like; and trivalent metal ions such as $Al^{3+}$, $Fe^{3+}$, and $Cr^{3+}$. Examples of anions include $Cl^-$, $I^-$, $Br^-$, $SO_4^{2-}$, $ClO_3^-$, $NO_3^-$, and $HCOO^-$, $CH_3COO^-$, $-(CH_2COO^-)_2$, and the like. Among these polyvalent metal salts, calcium salts and magnesium salts are preferable from the viewpoints of stability of the reaction liquid and reactivity as an aggregating agent.

Preferable examples of organic acids include phosphoric acid, polyacrylic acid, acetic acid, glycolic acid, malonic acid, malic acid, maleic acid, ascorbic acid, succinic acid, glutaric acid, fumaric acid, citric acid, tartaric acid, lactic acid, sulfonic acid, orthophosphoric acid, pyrrolidonecarboxylic acid, pyrone carboxylic acid, pyrrole carboxylic acid, furancarboxylic acid, pyridine carboxylic acid, coumaric acid, thiophene carboxylic acid, nicotinic acid, a derivative of these compounds, or a salt thereof, and the like. One kind of organic acid may be used singly, or two or more kinds may be used in a combination.

Examples of cationic polymers include a cationic urethane resin, a cationic olefin resin, a cationic allylamine resin, a polyamide resin, a polyamine resin, and the like. Examples of the polyamine resin include dimethylamine-epichlorohydrin copolymers and the like.

As the cationic urethane resin, it is possible to appropriately select and use known resins. It is possible to use commercial products as the cationic urethane resins and, for example, it is possible to use Hydran CP-7010, CP-7020, CP-7030, CP-7040, CP-7050, CP-7060, and CP-7610 (the above are trade names, manufactured by Dainippon Ink & Chemicals, Inc.), Superflex 600, 610, 620, 630, 640, and 650

(the above are trade names, manufactured by DKS Co., Ltd), urethane emulsion WBR-2120C and WBR-2122C (the above are trade names, manufactured by Taisei Fine Chemical Co., Ltd.), and the like.

The cationic olefin resin has an olefin such as ethylene or propylene in the structural skeleton thereof, and it is possible to appropriately select and use known resins. In addition, the cationic olefin resin may be in an emulsion state of being dispersed in a solvent including water, an organic solvent, or the like. As the cationic olefin resin, it is possible to use commercial products and examples thereof include Arrow-Base CB-1200, CD-1200 (the above are trade names, manufactured by Unitika Ltd.), and the like.

It is possible to appropriately select and use known resins as the cationic allylamine resins, and examples thereof include polyallylamine hydrochloride, polyallylamine amide sulfate, allylamine hydrochloride-diallylamine hydrochloride copolymer, allylamine acetate-diallylamine acetate copolymer, allylamine hydrochloride-dimethylallylamine hydrochloride copolymer, allylamine hydrochloride-dimethylallylamine hydrochloride copolymer, allylamine-dimethylallylamine copolymer, polydiallylamine hydrochloride, polymethyldiallylamine hydrochloride, polymethyldiallylamine amide sulfate, polymethyldiallylamine acetate, polydiallyldimethylammonium chloride, diallylamine acetate-sulfur dioxide copolymer, diallylmethylethylammoniumethylsulfate-sulfur dioxide copolymers, methyl diallyl amine hydrochloride-sulfur dioxide copolymers, diallyldimethylammonium chloride-sulfur dioxide copolymers, diallyldimethylammonium chloride-acrylamide copolymer, and the like. It is possible to use commercial products such as cationic allylamine resins and, for example, it is possible to use PAA-HCL-01, PAA-HCL-03, PAA-HCL-05, PAA-HCL-3L, PAA-HCL-10L, PAA-H-HCL, PAA-SA, PAA-01, PAA-03, PAA-05, PAA-08, PAA-15, PAA-15 C, PAA-25, PAA-H-10C, PAA-D11-HCL, PAA-D41-HCL, PAA-D19-HCL, PAS-21CL, PAS-M-1L, PAS-M-1, PAS-22 SA, PAS-M-1A, PAS-H-1L, PAS-H-5L, PAS-H-10L, PAS-92, PAS-92A, PAS-J-81L, and PAS-J-81 (the above are trade names, manufactured by Nittobo Medical Co., Ltd.), Hymo Neo-600, Hymolock Q-101, Q-311, Q-501, and Himax SC-505 and SC-505 (the above are trade names, manufactured by Hymo Co., Ltd.), or the like.

As the dimethylamine-epichlorohydrin copolymer, it is possible to appropriately select and use known dimethylamine-epichlorohydrin copolymers. It is possible to use commercial products as the dimethylamine-epichlorohydrin copolymer and examples thereof include Unisense KHE-104L (trade name, manufactured by Senka Corp.), Kachiomasuta PD-7 (trade name, manufactured by Yokkaichi Chemical Company, Ltd.), or the like.

Examples of cationic surfactants include primary, secondary, and tertiary amine salt type compounds, alkylamine salts, dialkylamine salts, aliphatic amine salts, benzalkonium salts, quaternary ammonium salts, quaternary alkyl ammonium salts, alkyl pyridinium salts, sulfonium salts, phosphonium salts, onium salts, imidazolinium salts, and the like. Specific examples of cationic surfactants include hydrochlorides such as laurylamine, Coco amine, and rosinamine, acetates, and the like, lauryltrimethylammonium chloride, cetyltrimethylammonium chloride, benzyltributylammonium chloride, benzalkonium chloride, dimethylethyl lauryl ammonium chloride ethyl sulfate, dimethyl ethyl octyl ammonium ethyl sulfate, trimethyl lauryl ammonium hydrochloride, cetyl pyridinium chloride, cetyl pyridinium bromide, dihydroxyethyl lauryl amine, decyl dimethyl benzyl ammonium chloride, dodecyl dimethyl benzyl ammonium chloride, tetradecyl dimethyl ammonium chloride, hexadecyl dimethyl ammonium chloride, octadecyl dimethyl ammonium chloride, and the like.

The content of the aggregating agent in the reaction liquid is preferably 1% by mass or more and 25% by mass or less with respect to the total mass (100% by mass) of the reaction liquid, more preferably 2% by mass or more and 20% by mass or less, and even more preferably 3% by mass or more and 10 or less.

1.3.2. Water

The reaction liquid according to the present embodiment is preferably an aqueous reaction liquid with water as the main solvent. This water is a component which is evaporated and scattered by drying after attaching the reaction liquid to the recording medium. As the water, water is preferable in which ionic impurities are removed as much as possible like pure water or ultrapure water such as ion-exchanged water, ultra-filtered water, reverse osmosis water, and distilled water. In addition, the use of water sterilized by ultraviolet ray irradiation or the addition of hydrogen peroxide or the like is suitable since it is possible to prevent the propagation of fungi and bacteria in a case where the reaction liquid is stored for a long time. It is possible to set the lower limit of the water content included in the reaction liquid to, for example, 40% by mass or more with respect to the total mass (100% by mass) of the reaction liquid, preferably 50% by mass or more, and more preferably 60% by mass or more. In addition, the upper limit of the water content is preferably 90% by mass or less with respect to the total mass (100% by mass) of the reaction liquid, and more preferably 80% by mass or less.

1.3.3. Surfactant

The reaction liquid according to the present embodiment contains a surfactant. The surfactant being contained decreases the surface tension of the reaction liquid and makes it possible to improve the wettability with the recording medium.

As the surfactant, it is possible to use the same surfactants as exemplified for the ink composition described above, but it is preferable to include a nonionic surfactant. Including a nonionic surfactant makes it possible to suppress the generation of pinholes and to obtain a reaction liquid excellent in storage stability.

In addition, as the surfactant, the acetylene glycol-based surfactant, silicone-based surfactant, and fluorine-based surfactant described above are preferably used, in particular, an acetylene glycol-based surfactant or a silicone-based surfactant is preferably used. These surfactants wet and spread easily on the recording medium and are highly effective in suppressing the generation of pinholes. In addition, in the present embodiment, the reaction liquid may contain at least one of a silicone-based surfactant and an acetylene glycol-based surfactant, and a fluorine-based surfactant.

The lower limit of the content of the acetylene glycol-based surfactant and the silicone-based surfactant is preferably 1.5% by mass or more with respect to the total mass (100% by mass) of the reaction liquid, more preferably 2% by mass or more, and particularly preferably 3% by mass or more. On the other hand, the upper limit of the content is preferably 10% by mass or less, more preferably 9% by mass or less, and particularly preferably 8% by mass or less. When the contents of the acetylene glycol-based surfactant and the silicone-based surfactant are within the above ranges, the generation of pinholes is suppressed and it is possible to obtain a reaction liquid having excellent storage stability.

The lower limit of the content of the fluorine-based surfactant is preferably 0.5% by mass or more with respect to the total mass (100% by mass) of the reaction liquid, and more preferably 1% by mass or more. On the other hand, the upper limit of the content is preferably 4% by mass or less, and more preferably 3% by mass or less. When the content of the fluorine-based surfactant is within the above range, there is a uniform spreading action so as to not cause density unevenness or bleeding of the ink, which is preferable.

The lower limit of the total content S1 of the surfactant is 2% by mass or more with respect to the total mass (100% by mass) of the reaction liquid, preferably 2.5% by mass or more, and more preferably 3% by mass or more. On the other hand, the upper limit of the content of the surfactant is 10% by mass or less, preferably 9% by mass or less, more preferably 8% by mass or less, and even more preferably 7% by mass or less. When the content of the surfactant is in the above range, the generation of pinholes is suppressed and it is possible to obtain a reaction liquid excellent in storage stability.

The content S2 of the surfactant included in the ink is preferably smaller than the content S1 of the surfactant of the reaction liquid on a mass basis, and the lower limit of the ratio S1/S2 of S1 and S2 is preferably 1.5 or more, more preferably 2 or more, and even more preferably 2.5 or more. In addition, the upper limit of S1/S2 is preferably 10 or less, more preferably 6 or less, and even more preferably 4 or less. When S1/S2 is in the above range, it is possible to further suppress the generation of pinholes.

1.3.4. Organic Solvent

The reaction liquid according to the present embodiment may contain an organic solvent. An organic solvent being contained improves the wettability of the reaction liquid with respect to the recording medium. As the organic solvent, it is possible to use the same organic solvents as those exemplified for the ink composition described above. The content of the organic solvent is not particularly limited, but is able to be set to, for example, 10% by mass or more and 70% by mass or less with respect to the total mass (100% by mass) of the reaction liquid, preferably 15% by mass or more and 60% by mass or less, and more preferably 20% by mass or more and 50% by mass or less.

For the standard boiling point of the organic solvent, it is possible for the standard boiling point of the organic solvent which may be contained in the ink composition to be set independently of the preferable temperature range of the standard boiling point of the organic solvent which may be contained in the ink composition. Alternatively, the lower limit of the standard boiling point of the organic solvent is preferably 180° C. or higher, more preferably 190° C. or higher, and even more preferably 200° C. or higher. In addition, the upper limit of the standard boiling point of the organic solvent is preferably 300° C. or lower, more preferably 280° C. or lower, and even more preferably 250° C. or lower.

Here, as the organic solvent in the reaction liquid, in the same manner as the ink composition described above, the content of a water-soluble organic solvent having a standard boiling point over 280° C. in the reaction liquid is preferably 5% by mass or less, more preferably 3% by mass or less, even more preferably 2% by mass or less, yet more preferably 1% by mass or less, still more preferably 0.5% by mass or less, and particularly preferably 0.1% by mass or less. In this case, since the drying property of the reaction liquid is good, drying of the reaction liquid is quickly carried out, and the obtained recorded matter is excellent in stickiness reduction, water resistance, and abrasion resistance.

1.3.5. Other Components

The pH adjusting agent, antiseptic/fungicide, rust inhibitor, chelating agent, and the like described above may be added to the reaction liquid according to the present embodiment, as necessary.

1.3.6. Method for Preparing Reaction Liquid

It is possible to manufacture the reaction liquid according to the present embodiment by dispersing and mixing the respective components described above by an appropriate method. After sufficiently stirring each of the above components, filtration is carried out in order to remove coarse particles and foreign matter which cause clogging to obtain the desired reaction liquid.

1.3.7. Physical Properties of Reaction Liquid

In a case where the reaction liquid according to the present embodiment is ejected from an ink jet head using the ink jet method, the surface tension at 20° C. is preferably 18 mN/m or more and 33 mN/m or less, more preferably 20 mN/m or more and 30 mN/m or less, and even more preferably 22 mN/m or more and 25 mN/m or less. In addition, the difference between the surface tension of the reaction liquid and the surface tension of the ink composition described above is preferably within 5. For the measurement of the surface tension, for example, it is possible to carry out measurement by confirming the surface tension when a platinum plate is wetted with the reaction liquid in an environment of 20° C. using an automatic surface tensiometer CBVP-Z (trade name, manufactured by Kyowa Interface Science Co., Ltd.).

In addition, from the same viewpoint, the viscosity of the reaction liquid according to the present embodiment at 20° C. is preferably 3 mPa·s or more and 10 mPa·s or less, and more preferably 3 mPa·s or more and 8 mPa·s or less. Here, it is possible to measure the viscosity, for example, using a viscoelasticity tester MCR-300 (trade name, manufactured by Physica) in an environment of 20° C.

As described above, in the reaction liquid according to the present embodiment, by setting the content of the surfactant to 2% by mass or more and 10% by mass or less with respect to the total mass of the reaction liquid, the reaction liquid has excellent storage stability, in addition, the reaction liquid wets and spreads uniformly on the recording medium and reaction liquid non-attaching regions are decreased. In addition, even in a case where the ink is attached to the reaction liquid non-attaching region and the ink composition and the reaction liquid do not come into direct contact with each other, the adjacent ink comes into contact and mixes with the reaction liquid to make wetting and spreading possible even to a portion to which the ink composition is not attached. Furthermore, the content of the surfactant being within the above range makes cissing less likely to occur during drying of the ink composition and makes pinholes less likely to be generated. Due to this, it is possible to provide a reaction liquid which suppresses the generation of pinholes and which has excellent storage stability.

1.4. Recording Medium

The ink composition described above has an ink drying property and is able to suppress the generation of pinholes and to obtain an image excellent in image quality and abrasion resistance in recording on a recording medium having an ink absorbing property, an ink non-absorbing property, or a low absorbing property. In addition, it is possible to suitably use the ink composition described above so as to be able to suppress the generation of pinholes, in particular, even with respect to a recording medium with an ink non-absorbing property, or a low absorbing property by using the ink composition together with the reaction liquid according to the present embodiment.

Examples of the ink absorbing recording medium include fabrics such as cotton, silk, polyester, polyurethane, and nylon with a high ink absorbing property, plain paper, paper exclusively for ink jet use, high quality paper with a moderate absorbing property, plain paper such as recycled paper, copy paper, ink jet special paper provided with an ink receiving layer having ink absorbing ability, and the like.

Examples of recording media with an ink non-absorbing property include a plastic film which is not surface-treated for ink jet recording (that is, on which an ink absorbing layer is not formed), a recording medium where plastic is coated on a base material such as paper, a recording medium to which a plastic film is attached, or the like. Examples of plastics here include polyvinyl chloride, polyethylene terephthalate, polycarbonate, polystyrene, polyurethane, polyethylene, polypropylene, and the like.

Examples of recording media with a low ink absorbing property include a recording medium provided with a coating layer for receiving ink on the surface thereof and, in a case of a recording medium where the base material is paper, examples include printing paper such as art paper, coated paper, and matte paper, while in a case of a recording medium where the base material is a plastic film, examples include recording media in which a hydrophilic polymer is coated on the surface of polyvinyl chloride, polyethylene terephthalate, polycarbonate, polystyrene, polyurethane, polyethylene, polypropylene or the like, or recording media in which particles such as silica or titanium are coated with a binder. These recording media may be transparent recording media.

Here, the "recording medium with an ink non-absorbing property or with a low ink absorbing property" in the present specification means a "recording medium having a water absorption amount of 10 mL/m$^2$ or less from the start of contact to 30 msec$^{1/2}$ in the Bristow method". This Bristow method is the most popular method as a method for measuring the amount of liquid absorption in a short time and is also adopted by Japan Technical Association of the Pulp and Paper Industry (JAPAN TAPPI). The details of the test method are described in Standard No. 51 "Paper and paperboard-Liquid absorbing property test method-Bristow method" in "JAPAN TAPPI 2000 Paper Pulp Test Method".

In addition, it is possible to suitably use the above with respect to a recording medium with an ink non-absorbing property or a low ink absorbing property having irregularities on the surface thereof such as embossed media.

2. Recording Method

The recording method according to the present embodiment is a recording method provided with an ink composition attaching step of attaching the ink composition to a recording medium, and a reaction liquid attaching step of attaching the reaction liquid according to the present embodiment described above to the recording medium. A description will be given below of the recording method according to the present embodiment with reference to an example of recording using the ink jet recording apparatus described above.

2.1. Reaction Liquid Attaching Step

The reaction liquid attaching step is a step of attaching the reaction liquid which reacts with and aggregates the components of the ink composition on the recording medium. Attaching the reaction liquid to the recording medium makes it possible to improve the water resistance, abrasion resistance, and image quality of the recorded image obtained in the ink composition attaching step.

The reaction liquid attaching step may be before the attachment of the ink composition or after the attachment of the ink composition and, in addition, may be simultaneous with the attachment of the ink composition; however, attaching the reaction liquid before the attachment of the ink composition is preferable in terms of increasing the reactivity with the ink composition.

In addition, for example, in a case of using the ink jet recording apparatus 1 shown in the FIGURE, it is preferable that the recording medium M be heated by the preheater 8 shown in the FIGURE before the reaction liquid attaching step or by the IR heater 4 or the platen heater 5 shown in the FIGURE at the time of the reaction liquid attaching step. By allowing the reaction liquid to attach to the heated recording medium M, the reaction liquid ejected onto the recording medium M easily coats and spreads on the recording medium M, and it is possible to uniformly coat the reaction liquid. For this reason, the reaction liquid non-attaching regions are reduced and the ink attached in the ink composition attaching step described below reacts sufficiently with the reaction liquid to obtain excellent image quality with reduced pinholes. In addition, since the reaction liquid is uniformly coated on the recording medium M, it is possible to reduce the coating amount and to prevent a reduction in the water resistance or abrasion resistance of the obtained image.

Here, the surface temperature of the recording medium M at the time of attaching the reaction liquid is able to be set independently of the temperature within the preferable range of the surface temperature (primary heating temperature) of the recording medium M at the time of attaching ink described below. For example, the surface temperature of the recording medium M when attaching the reaction liquid is preferably 45° C. or lower, more preferably 40° C. or lower, even more preferably 38° C. or lower, and particularly preferably 35° C. or lower. In addition, the lower limit of the surface temperature of the recording medium M when attaching the reaction liquid is preferably 25° C. or higher, more preferably 30° C. or higher, and even more preferably 32° C. or higher. In a case where the surface temperature of the recording medium M at the time of attaching the reaction liquid is within the above range, it is possible to uniformly apply the reaction liquid to the recording medium M, to suppress the generation of pinholes, and to improve the water resistance, abrasion resistance, and the image quality. In addition, it is possible to suppress the influence of heat on the ink jet head 3.

The lower limit of the maximum attachment amount of the reaction liquid per unit of area to the recording medium M is preferably 0.3 mg/inch$^2$ or more, more preferably 0.5 mg/inch$^2$ or more, and even more preferably 0.8 mg/inch$^2$ or more. The upper limit of the maximum attaching amount of the reaction liquid per unit of area of the recording medium is not particularly limited, but is, for example, preferably 8 mg/inch$^2$ or less, more preferably 6 mg/inch$^2$ or less, and particularly preferably 5 mg/inch$^2$ or less. When the maximum attachment amount of the reaction liquid is within the above range, the generation of pinholes is suppressed and the abrasion resistance and water resistance of the recorded matter are improved.

Here, attachment of the reaction liquid may be performed by ejection by the ink jet head 3, or may be performed by other methods, for example, a method for coating the reaction liquid with a roll coater or the like, a method for ejecting the reaction liquid, and the like.

2.2. Ink Composition Attaching Step

The ink composition attaching step is a step of ejecting the ink composition described above from the ink jet head 3 to the recording medium M or to the recording medium M on which the reaction liquid attaching step is performed so as to attach to the recording medium M. Through this step, the ink droplets and the reaction liquid react on the recording medium M. Due to this, an image formed of the ink composition is formed on the surface of the recording medium M. In addition, due to the reaction liquid containing an aggregating agent, the aggregating agent reacts with the components of the ink on the recording medium M, and it is possible to obtain superior image quality, water resistance, and abrasion resistance.

In addition, in the present embodiment, by using a reaction liquid in which a content of the surfactant is 2% by mass or more and 10% by mass or less with respect to the total mass of the reaction liquid, the reaction liquid uniformly wets and spreads on the recording medium so as to decrease the reaction liquid non-attaching regions. In addition, cissing during drying of the ink composition is less likely to occur and pinholes are less likely to be generated. Due to this, it is possible to provide a recording method in which the generation of pinholes is suppressed.

In the present embodiment, "image" indicates a recording pattern formed from a group of dots, including text printing and solid images. Here, "solid image" means an image pattern of an image in which dots are recorded in all pixels of the pixels which are the minimum recording unit region defined by a recording resolution, and in which the recording region of the recording medium is normally covered with ink and the base of the recording medium is not visible.

In the present embodiment, the ink composition attaching step may be performed at the same time as the reaction liquid attaching step, but is preferably performed after the reaction liquid attaching step. In addition, the ink composition attaching step is preferably performed in a state in which the solvent component of the reaction liquid remains on the surface of the recording medium M. In the present embodiment, attaching the ink composition to the reaction liquid in a semi-dry state mixes the ink composition with the reaction liquid such that the wetting and spreading thereof is sufficient, thus, it is possible to suppress the generation of pinholes. In addition, the content of the surfactant in the reaction liquid being 2% by mass or more and 10% by mass or less with respect to the total mass of the reaction liquid makes it possible for the ink to wet and spread even to a portion to which the ink is not attached and to suppress the generation of pinholes.

The maximum attachment amount of the ink composition per unit of area on the recording medium M is preferably 5 mg/inch$^2$ or more, more preferably 7 mg/inch$^2$ or more, and particularly preferably 10 mg/inch$^2$ or more. The upper limit of the attachment amount of the ink composition per unit of area of the recording medium is not particularly limited, but is preferably 30 mg/inch$^2$ or less, more preferably 25 mg/inch$^2$ or less, and particularly preferably 20 mg/inch$^2$ or less.

In addition, in the recording region of the recording medium M, it is preferable to have a region where, with respect to the attachment amount of the ink composition to a predetermined region, the ratio of the attachment amount of the reaction liquid to this region is 2% by mass or more, it is more preferable to have a region where the attachment amount ratio is 3% by mass or more, it is even more preferable to have a region where the attachment amount ratio is 4% by mass or more, and it is particularly preferable to have a region where the attachment amount ratio is 5% by mass or more. In addition, in the recording region of the recording medium M, it is preferable to have a region where, with respect to the attachment amount of the ink composition to a predetermined region, the ratio of the attachment amount of the reaction liquid to this region is 40% by mass or less, it is more preferable to have a region where the attachment amount ratio is 30% by mass or less, it is even more preferable to have a region where the attachment amount ratio is 25% by mass or less, and it is particularly preferable to have a region where the attachment amount ratio is 20% by mass or less. When the attaching amount ratio is within the above range, the ink sufficiently wets and spreads, thus, the generation of pinholes is suppressed, bleeding is reduced, image quality is improved, and the water resistance and abrasion resistance of the obtained recorded matter are improved.

In the recording region described above, it is preferable to have a region in which, with respect to a total attachment amount of the attachment amount of the ink composition to the predetermined region and the attachment amount of the reaction liquid to the region, the total amount of the surfactant included in the reaction liquid and the surfactant included in the ink composition is 0.6% by mass or more, it is more preferable to have a region in which the total amount of the surfactants is 0.85% by mass or more, and it is even more preferable to have a region in which the total amount of the surfactants is 1% by mass or more. In addition, in the recording region described above, it is preferable to have a region in which, with respect to the total attachment amount of the attachment amount of the ink composition to the predetermined region and the attachment amount of the reaction liquid to this region, the total amount of the surfactant included in the reaction liquid and the surfactant included in the ink composition is 2.3% by mass or less, it is more preferable to have a region in which the total amount of the surfactants is 2% by mass or less, and it is even more preferable to have a region in which the total amount of the surfactants is 1.8% by mass or less. By the total amount of the surfactants being within the above range, the ink sufficiently wets and spreads, thus, the generation of pinholes is suppressed, the bleeding is reduced, the image quality is improved, and the water resistance and abrasion resistance of the obtained recorded matter are improved.

In addition, in the ink composition attaching step, in a case of attaching the reaction liquid and the ink composition by the ink jet method, the maximum droplet amount of the ink composition is preferably greater than the maximum droplet amount of the reaction liquid. Due to this, since the ink composition sufficiently spreads and spreads, the generation of pinholes is suppressed, bleeding is reduced, image quality is improved, and water resistance and abrasion resistance of the obtained recorded matter are improved.

The ink composition attaching step may be provided with a heating step of heating the recording medium M with the IR heater 4 or the platen heater 5 before the ink composition attaching step or at the same time as the ink composition attaching step, and the ink composition attaching step is preferably performed on the recording medium M heated by the heating step. Due to this, it is possible to quickly dry the ink on the recording medium M, and bleeding is suppressed. In addition, it is possible to form an image excellent in water resistance, abrasion resistance, and image quality, and, by using the ink described above, it is possible to provide an ink jet recording method excellent in ejection reliability.

The upper limit of the surface temperature (primary heating temperature) of the recording medium M at the time of attaching the ink is preferably 45° C. or lower, more preferably 40° C. or lower, even more preferably 38° C. or lower, and particularly preferably 35° C. or lower. The surface temperature of the recording medium at the time of attaching ink being in the above range makes it possible to suppress the influence of heat on the ink jet head 3, to prevent clogging of the ink jet head 3 and the nozzle, and to improve ejection reliability. In addition, the lower limit of the surface temperature of the recording medium M at the time of ink jet recording is preferably 25° C. or higher, more preferably 30° C. or higher, and even more preferably 32° C. or higher. When the surface temperature of the recording medium M during ink jet recording is in the above range, it is possible to quickly dry the ink on the recording medium M and fix the ink at an early stage, bleeding is suppressed, and it is possible to form an image excellent in water resistance, abrasion resistance, and image quality.

2.3. Secondary Heating Step

The recording method according to the present embodiment may have a secondary heating step of heating the recording medium M to which the ink composition is attached by the curing heater 6 shown in the FIGURE after the ink composition attaching step. Due to this, the fixing resin and the like included in the ink composition on the recording medium M are melted to form an ink film, the ink film firmly fixes (attaches) to the recording medium M, the film forming property is excellent, and it is possible to obtain a high-quality image excellent in water resistance and abrasion resistance in a short time.

The upper limit of the surface temperature of the recording medium M according to the curing heater 6 is preferably 120° C. or lower, more preferably 100° C. or lower, and even more preferably 90° C. or lower. In addition, the lower limit of the surface temperature of the recording medium M is preferably 60° C. or higher, more preferably 70° C. or higher, and even more preferably 80° C. or higher. When the temperature is within the above range, it is possible to obtain a high-quality image in a short time.

Here, after the secondary heating step, there may be a step of cooling the ink composition on the recording medium M using the cooling fan 7 shown in the FIGURE.

2.4. Other Steps

The ink jet recording method according to the present embodiment may be provided with a cleaning step of discharging the ink composition and the reaction liquid by a unit other than a pressure generating unit that ejects ink to carry out recording, that is, by a mechanism other than the mechanism for ejecting ink for recording provided in the ink jet head 3.

Examples of a mechanism for ejecting ink for recording provided in the ink jet head 3 include a piezo element or a heater element provided in the pressure chamber 21 to apply pressure to ink. This cleaning step may be a step of externally applying pressure to the ink jet head 3 to discharge the ink composition or reaction liquid from the nozzle. By providing this step, even in a case where there is a concern that the resin will be deposited on the inner wall of the ink jet head 3, it is possible to suppress such suppression and to further improve the ejection reliability.

Here, examples of the other mechanisms described above include a mechanism for applying pressure such as application of suction (negative pressure) or the application of positive pressure from the upstream of the ink jet head. These mechanisms are not ink discharging (flushing) using the function of the ink jet head itself. In other words, these mechanisms are not discharging using the function of ejecting ink from the ink jet head in recording.

As described above, the recording method according to the present embodiment is provided with the ink composition attaching step of attaching the ink composition to the recording medium and the reaction liquid attaching step of attaching the reaction liquid according to the present embodiment described above to the recording medium, in which by using a reaction liquid in which the content of the surfactant with respect to the total mass of the reaction liquid is 2% by mass or more and 10% by mass or less, the reaction liquid uniformly wets and spreads on the recording medium so as to decrease the reaction liquid non-attaching regions. In addition, even in a case where the ink attaches to the reaction liquid non-attaching region and the ink composition and the reaction liquid do not come into direct contact with each other, the adjacent ink comes into contact and mixes with the reaction liquid to make wetting and spreading possible even to a portion to which the ink composition is not attached. Furthermore, the content of the surfactant being within the above range makes cissing less likely to occur during drying of the ink composition and makes pinholes less likely to be generated. Due to this, it is possible to provide a recording method which suppresses the generation of pinholes.

3. Examples

A more specific description will be given below of embodiments of the invention with reference to Examples and Comparative Examples, but the present embodiment is not limited to only these Examples.

3.1. Preparation of Reaction Liquid and Ink 3.1.1. Preparation of Reaction Liquid Reaction liquids 1 to 17 were prepared by mixing and stirring each component according to the compositions shown in Table 1 and then carrying out filtering through a 10 μm membrane filter. All the numerical values in Table 1 indicate % by mass, and pure water was added such that the total mass of the reaction liquid was 100% by mass.

TABLE 1

|  |  | Reaction liquid 1 | Reaction liquid 2 | Reaction liquid 3 | Reaction liquid 4 | Reaction liquid 5 | Reaction liquid 6 | Reaction liquid 7 | Reaction liquid 8 | Reaction liquid 9 |
|---|---|---|---|---|---|---|---|---|---|---|
| Aggregating agent | Calcium acetate monohydrate | 5 | 5 | 5 | 5 | 5 | 5 | 5 | 5 | |
|  | Acetic acid |  |  |  |  |  |  |  |  | 1.8 |
|  | Cation Master PD (solid) |  |  |  |  |  |  |  |  |  |
| Solvent | Dipropylene glycol dimethyl ether | 20 | 20 | 20 | 20 | 20 | 20 | 20 | 20 | 20 |
|  | 1,2-hexanediol | 2 | 2 | 2 | 2 | 2 | 2 | 2 | 2 | 2 |
|  | 2-pyrrolidone | 10 | 10 | 10 | 10 | 10 | 10 | 10 | 10 | 10 |
| Antifoaming agent | DF110D | 0.3 | 0.3 | 0.3 | 0.3 | 0.3 | 0.3 | 0.3 | 0.3 | 0.3 |
| Surfactant | Dynol 607 | 4 |  |  | 2 | 3 |  | 1.5 | 2 | 4 |
|  | BYK348 |  | 4 |  |  | 1 | 3 |  | 1 |  |
|  | Surflon S-242 |  |  | 4 |  |  | 1 | 1.5 | 1 |  |
|  | Pure water | Remainder | Remainder | Remainder | Remainder | Remainder | Remainder | Remainder | Remainder | Remainder |
| Surfactant amount (S1) |  | 4 | 4 | 4 | 2 | 4 | 4 | 3 | 4 | 4 |
| Reaction liquid stability |  | A | A | A | A | A | A | A | A | A |

|  |  | Reaction liquid 10 | Reaction liquid 11 | Reaction liquid 12 | Reaction liquid 13 | Reaction liquid 14 | Reaction liquid 15 | Reaction liquid 16 | Reaction liquid 17 |
|---|---|---|---|---|---|---|---|---|---|
| Aggregating agent | Calcium acetate monohydrate |  | 10 | 5 | 5 | 5 | 5 | 5 | 5 |
|  | Acetic acid |  |  |  |  |  |  |  |  |
|  | Cation Master PD (solid) | 4 |  |  |  |  |  |  |  |
| Solvent | Dipropylene glycol dimethyl ether | 20 | 20 | 20 | 20 | 20 | 20 | 20 | 20 |
|  | 1,2-hexanediol | 2 | 2 | 2 | 2 | 2 | 2 | 2 | 2 |
|  | 2-pyrrolidone | 10 | 10 | 10 | 10 | 10 | 10 | 10 | 10 |
| Antifoaming agent | DF110D | 0.3 | 0.3 | 0.3 | 0.3 | 0.3 | 0.3 | 0.3 | 0.3 |
| Surfactant | Dynol 607 | 4 | 4 | 11 | 1.5 | 3 | 7 | 8 | 10 |
|  | BYK348 |  |  |  |  |  |  |  |  |
|  | Surflon S-242 |  |  |  |  |  |  |  |  |
|  | Pure water | Remainder | Remainder | Remainder | Remainder | Remainder | Remainder | Remainder | Remainder |
| Surfactant amount (S1) |  | 4 | 4 | 11 | 1.5 | 3 | 7 | 8 | 10 |
| Reaction liquid stability |  | A | A | B | A | A | A | A | A |

The details of the substances described in Table 1 are as follows.

Aggregating Agent
Polyvalent metal salt: Calcium acetate monohydrate
Organic acid: Acetic acid
Cationic resin: Kachiomasuta PD-7 (trade name, manufactured by Yokkaichi Chemical Company, Ltd., amine epichlorohydrin condensation type polymer)

Antifoaming Agent
DF110D (trade name "Surfynol DF110D", manufactured by Nissin Chemical Co., Ltd.)

Surfactant
Dynol 607 (trade name, manufactured by Nissin Chemical Co., Ltd., acetylene-based)
BYK 348 (trade name, manufactured by BYK Additives & Instruments, silicone-based)
Surflon S-211 (trade name, manufactured by AGC Seimi Chemical Co., Ltd., fluorine-based)

3.1.2. Preparation of Ink

Each of the components was mixed and stirred so as to obtain the blending ratio shown in Table 2 and filtered with a membrane filter having a pore size of 5 μm to obtain inks 1 to 6. The numerical values in Table 2 all indicate % by mass, and pure water was added such that the total mass of the ink was 100% by mass. In addition, the pigment, the resin emulsion and the wax emulsion are values in terms of solid content.

TABLE 2

|  |  | Ink 1 | Ink 2 | Ink 3 | Ink 4 | Ink 5 | Ink 6 |
|---|---|---|---|---|---|---|---|
| Pigment | PB15:3 | 5 | 5 | 5 | 5 | 5 | 5 |
| Solvent | 1,2-hexanediol | 5 | 5 | 5 | 5 | 5 | 5 |
|  | 1,3-butanediol | 7 | 7 | 7 | 7 | 7 | 7 |
|  | 2-pyrrolidone | 13 | 13 | 13 | 13 | 13 | 13 |
|  | St-Ac resin emulsion | 5 | 5 | 5 | 5 | 5 | 5 |
|  | Wax emulsion | 2 | 2 | 2 | 2 | 2 | 2 |
| Antifoaming agent | DF110D | 0.1 | 0.1 | 0.1 | 0.1 | 0.1 | 0.1 |
| Surfactant | Dynol 607 | 1 |  |  | 0.5 | 0.75 | 2 |
|  | BYK348 |  | 1 |  |  | 0.5 |  |
|  | Surflon S-242 |  |  | 1 |  |  |  |
| Surfactant amount (S2) |  | 1 | 1 | 1 | 0.5 | 1.25 | 2 |
| Ink storage stability |  | A | A | B | A | A | C |

Details of the substances described in Table 2 are as follows.

Pigment
  PB 15:3: C.I. Pigment Blue 15:3
Solvent
  Wax emulsion: AQUACER 515 (trade name, manufactured by BYK Additives & Instruments)
Antifoaming Agent
  DF110D (trade name "Surfynol DF110D", manufactured by Nisshin Chemical Industry Co., Ltd.)
Surfactant
  Dynol 607 (trade name, manufactured by Air Products Japan, acetylene-based)
  BYK 348 (trade name, manufactured by BYK Additives & Instruments, silicone-based)
  Surflon S-211 (trade name, manufactured by AGC Seimi Chemical Co., Ltd., fluorine-based)

The St-Ac (styrene-acrylic acid-based) resin emulsion was prepared by the following method.

100 parts of ion-exchanged water were added to a reaction container provided with a dropping apparatus, a thermometer, a water-cooled reflux condenser, and a stirrer, 0.2 parts of ammonium persulfate as a polymerization initiator were added at 70° C. in a nitrogen atmosphere while stirring, and a monomer solution in which 20 parts of styrene, 17 parts of methyl acrylate, 30 parts of methyl methacrylate, and 5 parts of acrylic acid were added was added dropwise into the reaction container and reacted to produce a shell polymer by polymerization. Thereafter, a mixed solution of 0.2 parts of potassium persulfate, 50 parts of styrene, and 22 parts of n-butyl acrylate was added dropwise thereto and subjected to a polymerization reaction at 70° C. while stirring, then neutralized with sodium hydroxide to adjust the pH to 8 to 8.5 and filtered through a 0.3 μm filter to obtain an emulsion (Tg 48° C., acid value 23 mg KOH/g) of fine resin particles 1.

3.2. Evaluation of Storage Stability of Reaction Liquid and Ink 3.2.1. Storage Stability Test of Reaction Liquid The reaction liquid was added to a glass bottle up to 80% and kept in a thermostatic environment at 60° C. for 3 days, the presence or absence of turbidity or separation in the state at 60° C. was confirmed, and evaluation was carried out according to the following criteria.

Evaluation Criteria
A: Turbidity or separation is not observed
B: Turbidity or separation is observed 3.2.2. Ink Storage Stability Test The ink composition was added to a glass bottle up to 80%, kept in a thermostatic environment at 70° C. for 3 days, the viscosity and particle diameter changes before and after storage were observed, and evaluation was carried out according to the following criteria. Here, for the viscosity changes, the ink viscosity at room temperature was measured with a viscometer (manufactured by Physica, trade name "MCR-300"), and the viscosity changes were calculated according to the following formula and evaluated.

[(Viscosity After Storage−Initial Viscosity)/(Initial Viscosity)]×100(%)

The particle diameter change is measured by measuring each mean volume diameter (MV) in the particle diameter distribution in the ink before and after storage, calculating the change in viscosity according to the formula below, and carrying out evaluation.

[(MV after storage−initial MV)/(initial MV)]×100 (%)

For the measurement of the mean volume diameter in the particle diameter distribution, a particle diameter distribution meter ("NANOTRAC UPA-EX 150" manufactured by Nikkiso Co., Ltd.) using dynamic light scattering method as a measurement principle was used.

Evaluation Criteria
A: Viscosity change ≤20%, particle diameter change ≤30%
B: Viscosity change ≤20%, 30%<particle diameter change ≤50%
C: Viscosity change >20%, particle diameter change >50%

3.3. Evaluation Test

Next, using the obtained reaction liquid and ink, the following evaluation test was conducted.

3.3.1. Preparing Recorded Matter

A recording medium was loaded into a remodeled machine of an ink jet printer (trade name "PX-G 930", manufactured by Seiko Epson Corp.), and the reaction liquid filled in the head was ink jet-coated thereon at a dot size of 7 ng, a resolution of 1440×1440 dpi, and the attachment amounts described in Tables 3 and 4. Next, the ink filled in the head was ink jet-coated on the reaction liquid attaching surface at a dot size of 7 ng, a resolution of 1440×1440 dpi, and the attachment amounts described in Tables 3 and 4. In the recording step, the surface temperature of the recording medium was adjusted so as to be the temperatures shown in Tables 3 and 4. In addition, after the recording step, the recorded matter was discharged from the printer and dried at 80° C. for 5 minutes. As a recording medium, a glossy polyvinyl chloride sheet (Roland DG Corp., model number "SV-G-1270G") was used.

TABLE 3

|  | Example 1 | Example 2 | Example 3 | Example 4 | Example 5 | Example 6 | Example 7 | Example 8 |
|---|---|---|---|---|---|---|---|---|
| Reaction liquid | Reaction liquid 1 | Reaction liquid 1 | Reaction liquid 1 | Reaction liquid 1 | Reaction liquid 1 | Reaction liquid 1 | Reaction liquid 2 | Reaction liquid 3 |
| S1 | 4 | 4 | 4 | 4 | 4 | 4 | 4 | 4 |
| Ink | Ink 1 | Ink 2 | Ink 3 | Ink 4 | Ink 5 | Ink 6 | Ink 1 | Ink 1 |
| S2 | 1 | 1 | 1 | 0.5 | 1.25 | 2 | 1 | 1 |
| S1/S2 | 4.0 | 4.0 | 4.0 | 8.0 | 3.2 | 2.0 | 4.0 | 4.0 |
| Reaction liquid application amount mg/inch$^2$ | 1.32 | 1.32 | 1.32 | 1.32 | 1.32 | 1.32 | 1.32 | 1.32 |
| Ink application amount mg/inch$^2$ | 11 | 11 | 11 | 11 | 11 | 11 | 11 | 11 |
| Reaction liquid/Ink application amount | 12% | 12% | 12% | 12% | 12% | 12% | 12% | 12% |
| Printed portion active agent concentration | 1.32% | 1.32% | 1.32% | 0.88% | 1.54% | 2.21% | 1.32% | 1.32% |

TABLE 3-continued

|  |  |  |  |  |  |  |  |
|---|---|---|---|---|---|---|---|
| Surface temperature (° C.) | 35 | 35 | 35 | 35 | 35 | 35 | 35 | 35 |
| White spots | A | A | A | A | A | A | A | B |
| Bleeding | A | A | A | B | A | A | A | A |
| Abrasion resistance | A | A | A | A | A | B | A | A |
| Water resistance | A | A | A | A | A | B | A | A |
| Ejection reliability | A | A | A | A | A | C | A | A |

|  | Example 9 | Example 10 | Example 11 | Example 12 | Example 13 | Example 14 | Example 15 |
|---|---|---|---|---|---|---|---|
| Reaction liquid | Reaction liquid 4 | Reaction liquid 17 | Reaction liquid 5 | Reaction liquid 6 | Reaction liquid 7 | Reaction liquid 8 | Reaction liquid 9 |
| S1 | 2 | 10 | 4 | 4 | 3 | 4 | 4 |
| Ink | Ink 1 | Ink 1 | Ink 1 | Ink 1 | Ink 1 | Ink 1 | Ink 1 |
| S2 | 1 | 1 | 1 | 1 | 1 | 1 | 1 |
| S1/S2 | 2.0 | 10.0 | 4.0 | 4.0 | 3.0 | 4.0 | 4.0 |
| Reaction liquid application amount mg/inch$^2$ | 1.32 | 1.32 | 1.32 | 1.32 | 1.32 | 1.32 | 1.32 |
| Ink application amount mg/inch$^2$ | 11 | 11 | 11 | 11 | 11 | 11 | 11 |
| Reaction liquid/Ink application amount | 12% | 12% | 12% | 12% | 12% | 12% | 12% |
| Printed portion active agent concentration | 1.11% | 1.96% | 1.32% | 1.32% | 1.21% | 1.32% | 1.32% |
| Surface temperature (° C.) | 35 | 35 | 35 | 35 | 35 | 35 | 35 |
| White spots | B | A | A | A | B | A | A |
| Bleeding | A | A | A | A | A | A | A |
| Abrasion resistance | A | B | A | A | A | A | A |
| Water resistance | A | B | A | A | A | A | A |
| Ejection reliability | A | A | A | A | A | A | A |

TABLE 4

|  | Example 16 | Example 17 | Example 18 | Example 19 | Example 20 | Example 21 | Example 22 | Example 23 |
|---|---|---|---|---|---|---|---|---|
| Reaction liquid | Reaction liquid 10 | Reaction liquid 11 | Reaction liquid 11 | Reaction liquid 1 | Reaction liquid 1 | Reaction liquid 1 | Reaction liquid 4 | Reaction liquid 1 |
| S1 | 4 | 4 | 4 | 4 | 4 | 4 | 2 | 4 |
| Ink | Ink 1 | Ink 1 | Ink 1 | Ink 1 | Ink 4 | Ink 4 | Ink 1 | Ink 1 |
| S2 | 1 | 1 | 1 | 1 | 0.5 | 0.5 | 1 | 1 |
| S1/S2 | 4.0 | 4.0 | 4.0 | 4.0 | 8.0 | 8.0 | 2.0 | 4.0 |
| Reaction liquid application amount mg/inch$^2$ | 1.32 | 1.32 | 0.55 | 0.55 | 0.495 | 0.32 | 2.86 | 1.32 |
| Ink application amount mg/inch$^2$ | 11 | 11 | 11 | 11 | 11 | 11 | 11 | 11 |
| Reaction liquid/Ink application amount | 12% | 12% | 5% | 5% | 4.5% | 2.9% | 26% | 12% |
| Printed portion active agent concentration | 1.32% | 1.32% | 1.14% | 1.14% | 0.65% | 0.60% | 1.21% | 1.32% |
| Surface temperature (° C.) | 35 | 35 | 35 | 35 | 35 | 35 | 35 | 48 |
| White spots | A | A | B | B | C | C | B | A |
| Bleeding | A | A | A | B | B | B | B | A |
| Abrasion resistance | A | A | A | A | A | A | B | A |
| Water resistance | A | A | A | A | A | A | C | A |
| Ejection reliability | A | B | A | A | A | A | B | C |

|  | Example 24 | Example 25 | Example 26 | Comparative Example 1 | Comparative Example 2 | Reference Examples |
|---|---|---|---|---|---|---|
| Reaction liquid | Reaction liquid 14 | Reaction liquid 15 | Reaction liquid 16 | Reaction liquid 13 | Reaction liquid 12 | — |
| S1 | 3 | 7 | 8 | 1.5 | 11 | — |
| Ink | Ink 1 | Ink 1 | Ink 1 | Ink 1 | Ink 1 | Ink 1 |
| S2 | 1 | 1 | 1 | 1 | 1 | 1 |
| S1/S2 | 3.0 | 7.0 | 8.0 | 1.5 | 11.0 | — |
| Reaction liquid application amount mg/inch$^2$ | 1.32 | 1.32 | 1.32 | 1.32 | 1.32 | — |

TABLE 4-continued

| | | | | | | |
|---|---|---|---|---|---|---|
| Ink application amount mg/inch² | 11 | 11 | 11 | 11 | 11 | 11 |
| Reaction liquid/Ink application amount | 12% | 12% | 12% | 12% | 12% | — |
| Printed portion active agent concentration | 1.21% | 1.64% | 1.75% | 1.05% | 2.07% | — |
| Surface temperature (° C.) | 34 | 35 | 35 | 35 | 35 | 35 |
| White spots | A | A | A | D | A | D |
| Bleeding | A | A | A | A | A | C |
| Abrasion resistance | A | A | B | A | B | A |
| Water resistance | A | A | B | A | C | A |
| Ejection reliability | A | A | A | A | A | A |

3.3.2. Evaluation of White Spots (Pinholes)

A 10×10 mm solid pattern was prepared under the conditions of 3.3.1. described above, and three points at freely chosen positions were observed at a magnification of 400 using a stereoscopic microscope (trade name "VHX-5000", manufactured by Keyence Corp.), and the area of white spot portions was evaluated according to the following criteria. Among the following, A to C are practical ranges.
Evaluation Criteria
A: White spot area≤0.03%
B: 0.03%<White spot area≤0.05%
C: 0.05%<White spot area≤0.15%
D: 0.15%<White spot area 3.3.3. Bleeding Evaluation A 10×10 mm solid pattern was prepared under the conditions of 3.3.1. described above, and the presence or absence of bleeding was visually confirmed and evaluated according to the following criteria. Among the following, A and B are practical ranges.
Evaluation Criteria
A: A state where the ink density is uneven in the pattern is not observed
B: Slight unevenness is recognized
C: Unevenness is recognized 3.3.4. Evaluation of Abrasion Resistance A 20×80 mm solid pattern was prepared under the conditions of 3.3.1. described above and the obtained recorded matter was evaluated for abrasion resistance using a vibrating color fastness rubbing tester AB-301 (trade name, manufactured by Tester Sangyo Co., Ltd.). Specifically, the surface of the recording medium on which the image is recorded is rubbed 30 times back and forth with a load of 300 g using a friction block covered with a white cotton cloth (conforming to JIS L 0803). The degree of peeling of the image (coating film) on the surface of the recording medium was visually observed and evaluated according to the following criteria. Among the following, A and B are practical ranges.
Evaluation Criteria
A: The coating film does not peel off even after being rubbed 20 times back and forth
B: Coating film peeling was recognized when rubbed 10 times or more and 19 times or less back and forth
C: Coating film peeling was recognized when rubbed 9 times or less back and forth 3.3.5. Evaluation of Water Resistance A 20×80 mm solid pattern was prepared under the conditions of 3.3.1. described above and the abrasion resistance was evaluated using a vibrating color fastness rubbing tester AB-301 (trade name, manufactured by Tester Sangyo Co., Ltd.). Specifically, the surface of the recording medium on which the image was recorded was rubbed with a load of 300 g with a friction block covered with a white cotton cloth (conforming to JIS L 0803) until the coating film was peeled off, or until rubbing was carried out 10 times back and forth. The degree of peeling of the image (coating film) on the surface of the recording medium was visually observed and evaluated according to the following criteria. Among the following, A and B are practical ranges.
Evaluation Criteria
A: The coating film is not peeled off, and attachment of the pigment to the cloth is not recognized
B: Peeling is not recognized in the coating film, but attachment to the cloth is recognized
C: Peeling is recognized in the coating film 3.3.6. Evaluation of Ink Ejection Reliability After continuously recording for 2 hours under the conditions of 3.3.1. described above, the number of missing nozzles out of 360 nozzles was determined and evaluated according to the following criteria. Among the following, A and B are practical ranges
Evaluation Criteria
A: No non-ejecting nozzle
B: 1 to 10 non-ejecting nozzles
C: 11 or more non-ejecting nozzles 3.4. Evaluation Results The results of the evaluation test are shown in the lower parts of Tables 1 to 4.

First, regarding the storage stability of the reaction liquid, as shown in Table 1, since the amount of the surfactant exceeded 10% by mass, turbidity and separation were observed in the reaction liquid 12.

In addition, regarding the storage stability of the ink, from Table 2, since a fluorine-based surfactant was used as the surfactant in ink 3, the storage stability was slightly lowered. On the other hand, the surfactant amount was 2% by mass in ink 6 and the storage stability decreased.

Next, a description will be given of the results of the recording test with reference to Tables 3 and 4.

In all of the examples, the white spot area was low, and it was possible to suppress the generation of pinholes. In contrast, in Comparative Example 1 using the reaction liquid 13 in which the surfactant amount was less than 2% by mass and in a Reference Example not using the reaction liquid, the white spot area was high and it was not possible to suppress the generation of pinholes. Here, in Comparative Example 2 using the reaction liquid 12, since the surfactant amount exceeded 10% by mass, the ink was sufficiently wetted and spread, and the generation of pinholes was low, but as described above, the storage stability was low.

A detailed description will be given below of each Example.

From Examples 1 to 3, regardless of the type of the surfactant of the ink, the white spot area was low and the generation of pinholes was low. In addition, no bleeding was observed, the abrasion resistance and water resistance were excellent, and the ejection reliability was also excellent.

According to a comparison between Example 1 and Example 4, when S1/S2 was high, slight bleeding was seen although the wetting and spreading of the ink was sufficient. In addition, according to a comparison between Example 1 and Examples 5 and 6, none of the evaluations changed even in a case where S1/S2 was low, but since the concentration of the surfactant in the ink was high, the abrasion resistance and water resistance were reduced. In addition, since the ink 6 itself has low ink storability, the ejection reliability was also lowered.

According to a comparison between Example 1 and Examples 7 and 8, in a case where the surfactant of the reaction liquid was a fluorine-based surfactant, the white spot area slightly increased. In addition, according to a comparison between Example 1 and Example 9, in a case where the surfactant amount in the reaction liquid was decreased, the wettability of the reaction liquid was slightly lowered and the white spot area slightly increased. On the other hand, according to a comparison between Example 1 and Example 10, in a case where the surfactant amount in the reaction liquid was increased, the abrasion resistance and water resistance were slightly lowered.

From Examples 11 to 14, even in an example where the surfactant of the reaction liquid was mixed and the combination of each was changed, in a case where the amount of the fluorine-based surfactant was increased, the white spot area slightly increased.

From Examples 1, 15, and 16, even in a case where the aggregating agent of the reaction liquid was changed, the generation of pinholes was low, no bleeding was observed, the abrasion resistance and water resistance were excellent, and the ejection reliability was also excellent.

From Examples 1, 17, and 18, in a case where the aggregating agent amount in the reaction liquid is large, the ejection decreases due to the influence of mist; however, in a case of decreasing the landing amount, no decrease in ejection reliability was seen, but the white spot area slightly increased. On the other hand, according to a comparison between Example 1 and Example 19, when the landing amount was small and the aggregating agent amount was small, the aggregation of the ink components was insufficient and bleeding was generated. According to a comparison between Example 4 and Example 20, when the surfactant amount in the printed portion was lowered, the wetting and spreading property of the ink decreased, the white spot area slightly increased, and bleeding was generated. On the other hand, according to a comparison between Example 4 and Example 21, when the landing amount of the reaction liquid was reduced using the same ink, the wetting and spreading property of the ink decreased, the white spot area slightly increased, and bleeding was generated.

According to a comparison between Example 9 and Example 22, the surfactant concentration of the printed portion is appropriate, but when the landing amount is increased excessively, the total amount of the liquid increases. Due to this, since drying was delayed, bleeding was generated, the abrasion resistance and water resistance were lowered, and the ejection reliability was also lowered.

According to a comparison between Example 1 and Example 23, when the recording temperature was high, the ejection reliability was lowered.

From Examples 24 to 26, when the surfactant amount in the reaction liquid increased to 8% by mass, the abrasion resistance and water resistance were slightly lowered.

The invention is not limited to the above-described embodiment, and various modifications are possible. For example, the invention includes configurations substantially the same as the configurations described in the embodiments (for example, configurations having the same function, method, and result, or configurations having the same object and effect). In addition, the invention includes configurations in which non-essential parts of the configurations described in the embodiments are replaced. In addition, the invention includes configurations which achieve the same operation and effect as the configurations described in the embodiments, or configurations able to achieve the same object. In addition, the invention includes configurations in which a publicly-known technique is added to the configurations described in the embodiments.

The entire disclosure of Japanese Patent Application No. 2017-188622, filed Sep. 28, 2017 is expressly incorporated by reference herein.

What is claimed is:

1. A set comprising a reaction liquid and an ink composition that are each to be attached to a recording medium, wherein:
   the ink composition includes a first nonionic surfactant;
   the reaction liquid includes an aggregating agent which aggregates components of the ink composition, an organic solvent having a standard boiling point that lies in the range of 180° C. to 280° C., water, and a second nonionic surfactant,
   a content of the organic solvent is 10 to 70% by mass with respect to a total mass of the reaction liquid,
   a content of the second nonionic surfactant is 2% by mass or more and 10% by mass or less with respect to the total mass of the reaction liquid, and
   a content S1 of the second nonionic surfactant included in the reaction liquid and a content S2 of the first nonionic surfactant contained in the ink composition have a relationship of S1/S2=1.5 to 4 on a mass basis.

2. The set according to claim 1, further comprising:
   one kind or more selected from a silicone-based surfactant, an acetylene glycol-based surfactant, and a fluorine-based surfactant as the second nonionic surfactant.

3. The set according to claim 1,
   wherein the content of the second nonionic surfactant is 3% by mass or more and 7% by mass or less.

4. The set according to claim 1,
   wherein the reaction liquid includes one kind selected from a polyvalent metal salt, a cationic polymer, and an organic acid as the aggregating agent.

5. The set according to claim 1,
   wherein the content of the organic solvent is 20 to 70% by mass with respect to a total mass of the reaction liquid.

6. The set according to claim 1,
   wherein the reaction liquid and the ink composition are attached to the recording medium using an ink jet method.

7. The set according to claim 1,
   wherein the ink composition includes a pigment and fine resin particles.

8. The set according to claim 1,
   wherein the ink composition includes a silicone-based surfactant and an acetylene glycol-based surfactant as the first nonionic surfactant.

9. The set according to claim 1,
   wherein the content of the second nonionic surfactant is 2 to 4% by mass with respect to a total mass of the reaction liquid.

10. The set according to claim 1,
wherein the content of the first nonionic surfactant is 0.5 to 3% by mass with respect to a total mass of the ink composition.

11. The set according to claim 1,
wherein the ink composition is attached to the recording medium using an ink jet method.

12. The set according to claim 1,
wherein when the ink composition and the reaction liquid are respectively attached to the recording medium, surface temperatures of the recording medium are respectively 38° C. or lower.

13. The set according to claim 1, wherein S1/S2=3.2 to 4.

14. The set according to claim 1, wherein the first nonionic surfactant and second nonionic surfactant are a silicone-based surfactant.

15. The set according to claim 1, wherein the reaction liquid includes 1,2-hexanediol.

16. The set according to claim 1, wherein the reaction liquid includes a nitrogen-containing solvent.

17. The set according to claim 1, wherein a content of an organic solvent having a standard boiling point over 280° C. is 1% by mass or less in each of the ink composition and the reaction liquid with respect to the total mass of the ink composition and the reaction liquid, respectively.

18. The set according to claim 1, wherein the ink composition includes an organic solvent having a standard boiling point of 180° C. to 280° C., and a content of the organic solvent having the standard boiling point of 180° C. to 280° C. is 15 to 40% by mass with respect to the total mass of the ink composition.

19. A recording method comprising:
attaching the set comprising the reaction liquid and the ink composition according to claim 1 to the recording medium.

20. The recording method according to claim 19,
wherein the ink composition includes a pigment, fine resin particles, and the first nonionic surfactant.

21. The recording method according to claim 19,
wherein the recording medium is a non-absorbing recording medium or a low-absorption recording medium.

22. The recording method according to claim 19,
wherein, when the ink composition and the reaction liquid are respectively attached to the recording medium, surface temperatures of the recording medium are respectively 45° C. or lower.

23. The recording method according to claim 19,
wherein the ink composition is attached in a state where a solvent component of the reaction liquid remains on the recording medium.

24. The recording method according to claim 19,
wherein, in a recording region of the recording medium, a region is provided in which, with respect to an attachment amount of the ink composition to a predetermined region, a ratio of the attachment amount of the reaction liquid to this region is 2% by mass or more and 40% by mass or less.

25. The recording method according to claim 24,
wherein, in the recording region, a region is provided in which, with respect to a total attachment amount of the ink composition to a predetermined region and the attachment amount of the reaction liquid to the region, a total amount of a surfactant included in the reaction liquid and a surfactant included in the ink composition is 0.85% by mass or more and 2% by mass or less.

26. The recording method according to claim 19,
wherein the reaction liquid and the ink composition are attached using an ink jet method and a maximum droplet amount of the ink composition is greater than a maximum droplet amount of the reaction liquid.

* * * * *